United States Patent
Paramesh et al.

(10) Patent No.: US 11,569,897 B2
(45) Date of Patent: Jan. 31, 2023

(54) SCALABLE, MULTI-LAYER MIMO TRANSCEIVER

(71) Applicant: Carnegie Mellon University, Pittsburgh, PA (US)

(72) Inventors: Jeyanandh Paramesh, Pittsburgh, PA (US); Susnata Mondal, Pittsburgh, PA (US); L. Richard Carley, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 17/164,079

(22) Filed: Feb. 1, 2021

(65) Prior Publication Data

US 2021/0194565 A1    Jun. 24, 2021

Related U.S. Application Data

(60) Continuation-in-part of application No. 17/113,288, filed on Dec. 7, 2020, now Pat. No. 11,251,859, which is a continuation of application No. 16/902,957, filed on Jun. 16, 2020, now Pat. No. 10,886,999, which is a division of application No. 16/163,374, filed on Oct. 17, 2018, now Pat. No. 10,707,947.

(60) Provisional application No. 62/967,616, filed on Jan. 30, 2020, provisional application No. 62/707,024, filed on Oct. 17, 2017.

(51) Int. Cl.
*H04B 7/08* (2006.01)
*H04B 1/00* (2006.01)
*H04B 1/16* (2006.01)
*H04B 7/0413* (2017.01)

(52) U.S. Cl.
CPC .......... *H04B 7/088* (2013.01); *H04B 1/0028* (2013.01); *H04B 1/0078* (2013.01); *H04B 1/16* (2013.01); *H04B 7/0413* (2013.01)

(58) Field of Classification Search
CPC .... H04B 7/088; H04B 1/0028; H04B 1/0078; H04B 1/16; H04B 7/0413
See application file for complete search history.

(56) References Cited

U.S. PATENT DOCUMENTS

| | | |
|---|---|---|
| 7,113,748 B2 | 9/2006 | Shapira et al. |
| 8,224,387 B2 | 7/2012 | Bishop |
| 9,094,102 B2 | 7/2015 | Corman et al. |
| 9,270,301 B2 | 2/2016 | Vaisanen et al. |
| 9,614,662 B2 | 4/2017 | Van der Goes |
| 9,640,866 B2 | 5/2017 | Kumar |

(Continued)

FOREIGN PATENT DOCUMENTS

WO    2016181231 A1    11/2016

*Primary Examiner* — Freshteh N Aghdam
(74) *Attorney, Agent, or Firm* — KDB Firm PLLC

(57) ABSTRACT

Disclosed herein is an innovative multi-layer hybrid/digital MIMO architecture that comprises single-stream or fully-connected (FC) multi-stream beamforming tiles (with RF complex-weights) in the first layer, followed by a fully connected (analog/digital) baseband layer. This architecture overcomes the complexity versus spectral-efficiency tradeoffs of existing hybrid MIMO architectures and enables MIMO stream/user scalability, superior energy-efficiency, and spatial-processing flexibility.

23 Claims, 20 Drawing Sheets
(20 of 20 Drawing Sheet(s) Filed in Color)

(56) References Cited

U.S. PATENT DOCUMENTS

| | | | |
|---|---|---|---|
| 10,218,490 B1* | 2/2019 | Yang | G01S 7/038 |
| 10,256,865 B2 | 4/2019 | Perumana et al. | |
| 10,256,894 B2 | 4/2019 | Eitan et al. | |
| 10,608,678 B1* | 3/2020 | Hormis | H04L 5/14 |
| 10,848,116 B2* | 11/2020 | Wu | H03G 1/0088 |
| 2002/0173337 A1 | 11/2002 | Hajimiri et al. | |
| 2003/0193997 A1* | 10/2003 | Dent | H04B 1/0057 |
| | | | 375/219 |
| 2006/0040709 A1 | 2/2006 | Adachi et al. | |
| 2006/0291589 A1 | 12/2006 | Eliezer et al. | |
| 2007/0280387 A1 | 12/2007 | Li et al. | |
| 2010/0099366 A1 | 4/2010 | Sugar et al. | |
| 2013/0102254 A1 | 4/2013 | Cyzs et al. | |
| 2014/0085143 A1* | 3/2014 | Chang | H01Q 1/28 |
| | | | 342/371 |
| 2014/0269864 A1 | 9/2014 | Aparin | |
| 2014/0334312 A1 | 11/2014 | Rivingston et al. | |
| 2014/0376657 A1 | 12/2014 | Agee et al. | |
| 2016/0037560 A1 | 2/2016 | Liu et al. | |
| 2016/0380745 A1 | 12/2016 | Wu et al. | |
| 2017/0041124 A1 | 2/2017 | Khandani | |
| 2017/0244451 A1 | 8/2017 | Raghavan et al. | |
| 2017/0331531 A1 | 11/2017 | Wu | |
| 2018/0183509 A1 | 6/2018 | Luo et al. | |
| 2018/0287841 A1 | 10/2018 | Subramanian et al. | |
| 2018/0316383 A1* | 11/2018 | Kamgaing | H04B 1/44 |
| 2018/0331740 A1 | 11/2018 | Orhan et al. | |
| 2018/0351619 A1 | 12/2018 | Khan | |
| 2018/0359019 A1 | 12/2018 | Han et al. | |
| 2019/0089435 A1 | 3/2019 | Mondal et al. | |
| 2019/0115963 A1 | 4/2019 | Zhu et al. | |
| 2019/0149276 A1 | 5/2019 | Xiong et al. | |
| 2019/0166603 A1 | 5/2019 | Wang | |
| 2019/0222449 A1 | 7/2019 | Subramanian et al. | |
| 2019/0296821 A1 | 9/2019 | Choi et al. | |
| 2019/0356375 A1* | 11/2019 | Friedman | H04B 7/0686 |
| 2019/0387504 A1 | 12/2019 | Jung et al. | |
| 2020/0106499 A1 | 4/2020 | Branlund | |
| 2021/0067118 A1* | 3/2021 | Patel | H01Q 21/0025 |
| 2021/0211248 A1 | 7/2021 | Moshfeghi | |
| 2021/0351816 A1 | 11/2021 | Raghavan et al. | |

\* cited by examiner

US 11,569,897 B2

SCALABLE, MULTI-LAYER MIMO TRANSCEIVER

RELATED APPLICATIONS

This application claims the benefit of U.S. Provisional Patent Application Ser. No. 62/967,616, filed Jan. 30, 2020, the contents of which are incorporated herein in their entirety. In addition, this application is a continuation-in-part of U.S. patent application Ser. No. 17/113,288, filed Dec. 7, 2020, the contents of which are incorporated herein in their entirety.

GOVERNMENT RIGHTS

This invention was made with U.S. government support under CNS1823235 awarded by the National Science Foundation. The U.S. government has certain rights in the invention.

BACKGROUND OF THE INVENTION

Multi-input-multi-output (MIMO) communication, along with beamforming at millimeter-wave frequencies, is a key element in beyond-5G wireless systems to simultaneously improve data-rate and channel capacity. Prototypes are currently being developed that support a wide variety of architectures starting with basic single-stream, phased-array beamforming at a single mm-wave frequency band, to multi-antenna polarization MIMO, multi-stream MIMO at a single frequency band, and reconfigurable multi-stream MIMO and multi-antenna inter-band carrier aggregation (CA) across two frequency bands. To realize multi-stream operation while performing energy-efficient RF domain spatial signal processing, two kinds of hybrid beamforming architectures are being considered of the partially connected (PC) and fully connected (FC) types. While PC structures are scalable, FC achieves superior spectral-efficiency, transmit and receive mode energy efficiency, and carrier aggregation (CA) from the entire aperture. However, scaling such FC architectures for more than two streams imposes significant challenges.

SUMMARY OF THE INVENTION

Disclosed herein is a novel multi-layer hybrid beamforming MIMO architecture that comprises multiple tiles of single-stream partially connected (PC-tile) or multi-stream fully connected (FC-tile) beamformers with RF-domain complex-weighting in a first layer, followed by one or more fully-connected additional layers in the analog/digital baseband domain. This architecture overcomes the complexity versus spectral-efficiency tradeoffs between single-layer PC and FC hybrid MIMO architectures and enables efficient upward scaling of the number of supported antennas as well as streams.

Further, low-complexity RF-tiles with additional baseband processing allows this architecture to achieve excellent energy-efficiency and algorithmic flexibility. It is also important to note that the use of FC-tiles instead of PC-tiles in the multi-layer architecture confers multiple additional advantages, such as improving the spectral efficiency, supporting CA from the full antenna aperture and full-duplex beamforming with per-element self-interference cancellation. The architectural tradeoffs, design concepts, and system simulations are also discussed herein.

Another key feature of the disclosed invention is a compact transceiver architecture having innovative circuit techniques that enable highly reconfigurable bidirectional operation. To this end, a Cartesian splitting based transmit beamforming architecture is first introduced, and then merged with the Cartesian combing based receive beamforming for compactness and dual-band operation. Further, the transceiver circuit architecture features a bidirectional beamforming network with passive structure reuse, bidirectional dual-band frequency translation capability, reconfigurable dual-band LO generation and distribution, Cartesian analog-domain second-layer beamforming, and a new phase-invariant constant-current programmable gain amplifier design. To demonstrate the aforementioned systemic, architectural, and circuit concepts, the design of a 28/37 GHz eight-element two-tile four-stream transceiver prototype is shown.

The invention has applicability in communication, radar and imaging systems, including, for example, 5G and beyond-5G wireless networks, fixed-wireless access networks, short-reach wireless access networks, wireless backhaul networks, Wi-Fi wireless networks, automotive radar/imaging, V2X communication/radar, autonomous transportation systems, satellite communication and many others.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

across transformer's coupling factor ($k_X$).

DETAILED DESCRIPTION

Figure 1A:
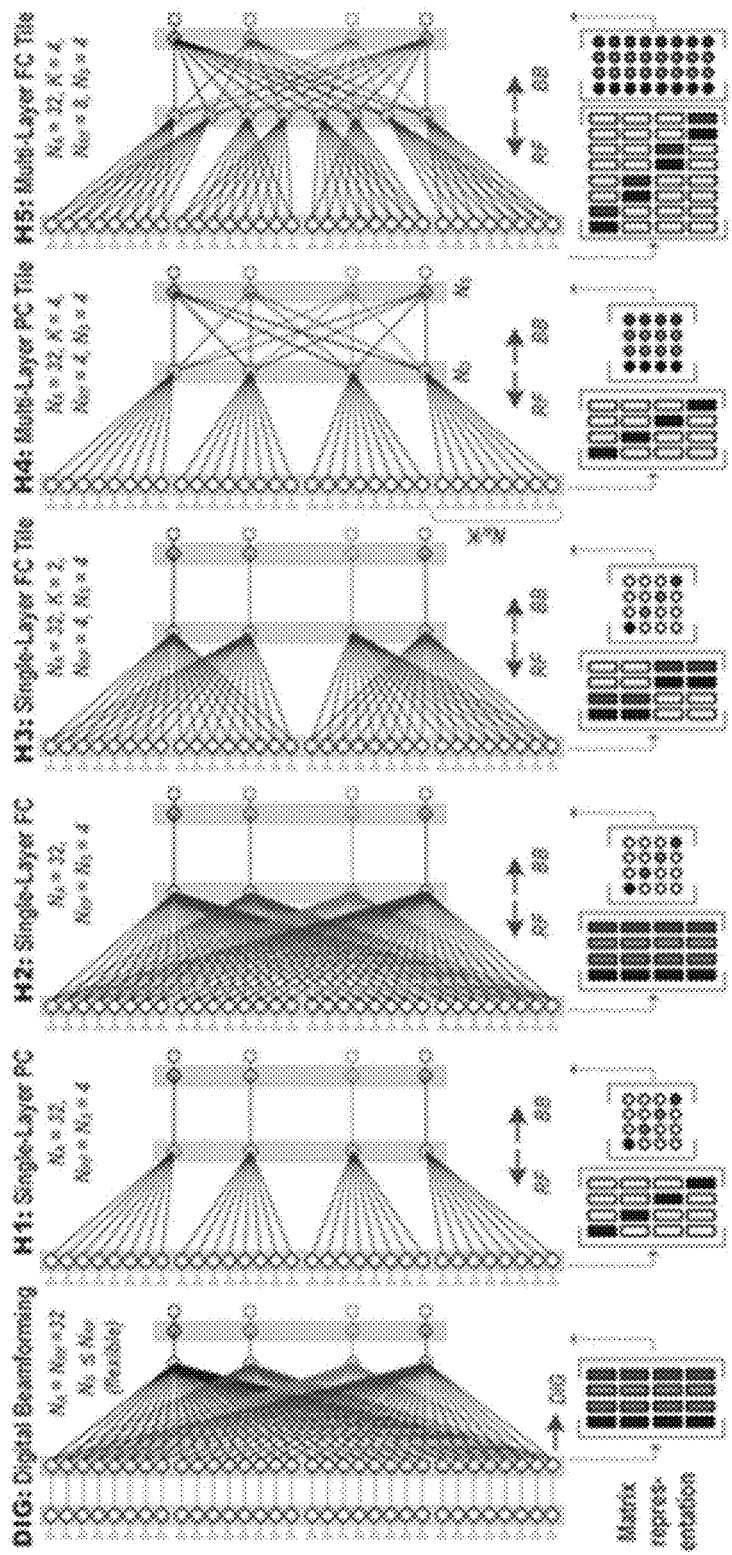
FIG. 1A shows signal-flow graph representation of various MIMO beamforming transceiver architectures, including digital beamforming, and single- and multi-layer hybrid beamforming. The architectures are compared in terms of spectral efficiency, scalability, complexity, beamforming flexibility, and energy efficiency.

MIMO systems allow the transmission or reception of multiple simultaneous data streams by means of independent beamforming for each stream. This section reviews existing MIMO system architectures and describes the proposed multi-layer architecture. Starting with signal-flow graph representations, as shown in FIG. 1A, the architectures are then compared in terms of spectral efficiency, scalability, complexity, beamforming flexibility, and energy efficiency.

Digital and Single-Layer Hybrid Beamformers

In digital beamformers (DBFs), spatio-temporal or spatio-spectral signal processing for $N_S$ data streams is performed by a digital signal processor (DSP) which is interfaced to an $N_A$-element antenna array by having one frequency translation chain and analog-digital conversion interface per element (i.e., $N_{RF}=N_A$). DBFs offer complete flexibility in terms of the number of supported streams and their beam patterns while also achieving the best spectral efficiency. Moreover, since the RF, analog-baseband and analog-digital interfaces in DBF's are modular, DBFs can in principle be easily scaled to large $N_A$, given the availability of a sufficiently capable DSP. However, DBF's suffer from high power and chip area for consumption in large antenna arrays, not just in the RF/analog portions, but also in the DSP for high throughput scenarios. Moreover, in DBF receivers, since no spatial filtering occurs before digitization the dynamic range and the effective-number-of-bits specifications of the ADC increase drastically.

Hybrid beamformers (HBF), on the other hand, perform extensive spatial signal processing in the RF domain, and have relatively few frequency translation chains and analog-digital interfaces to support digital MIMO processing. The number of frequency translation chains $N_{RF}$ is greater than but commensurate with $N_S$ which in turn is typically much smaller than $N_A$, (i.e., $N_A \gg N_{RF} \approx N_S$). Therefore, HBFs offer better area and energy efficiency than DBFs for a given $N_S$. FIG. 1A illustrates several HBF architectures using a pseudo signal-flow graph representation. Architectures H1-H3 feature a single spatial signal processing layer. The single-layer partially-connected (PC) architecture H1 is equivalent to having multiple phased array/RF-beamformer tiles (K=# tiles), one for each MIMO stream (hence, $K=N_{RF}=N_S$). Although this architecture has low complexity and can easily be scaled to multiple antennas/streams due to its modular tiled approach, in H1, only a subset of antenna elements is connected to each stream, thereby resulting in reduced per-stream beamforming gain. On the other hand, in the fully-connected (FC) architecture H2, each baseband stream is connected to the full aperture. Hence, H2 can achieve the same spectral efficiency as a DBF for identical $N_S$. Scaling H2 to support a greater number of streams is challenging. Therefore, the H1 and H2 architecture faces a spectral-efficiency versus scalability trade-off. This trade-off can be relaxed to a certain extent by using a single-layer HBF architecture with FC tiles (H3 in FIG. 1A, referred to as the hybrid connected structure). Here, K low-complexity FC tiles, each supporting two streams, are used to support $N_S$=2K MIMO streams. For each stream, the H3 architecture achieves twice the beamforming gain compared to H1. However, there is still a significant performance gap compared to H2 or DBF. Additionally, it is important to note that, single-layer HBFs (H1-H3) RF-domain-only spatial signal processing offer limited flexibility to implement beam acquisition, training and tracking algorithms compared to DBFs.

Multi-Layer Hybrid MIMO Architecture

The Multi-Layer Hybrid MIMO Architecture of the present invention uses K PC or FC tiles (H4 in FIG. 1A and H5, respectively in FIGS. 1A and 1B) in the first layer which interfaces $N_A$ antennas with $N_{RF}$ frequency translation chains ($N_{RF}$=K for H4; $N_{RF}$=2K for H5 with two-stream FC RF tiles). A second layer implements fully-connected beamforming from $N_{RF}$ baseband signals to $N_S$ streams at RF or baseband, in analog or digital domain. In contrast to the single-layer FC-HBF architectures, the new multi-layer architectures retain low RF-domain signal processing complexity while enabling upward scaling of $N_S$. Its spectral efficiency is superior to single-layer PC-HBF and approaches that of DBF.

Figure 1B:
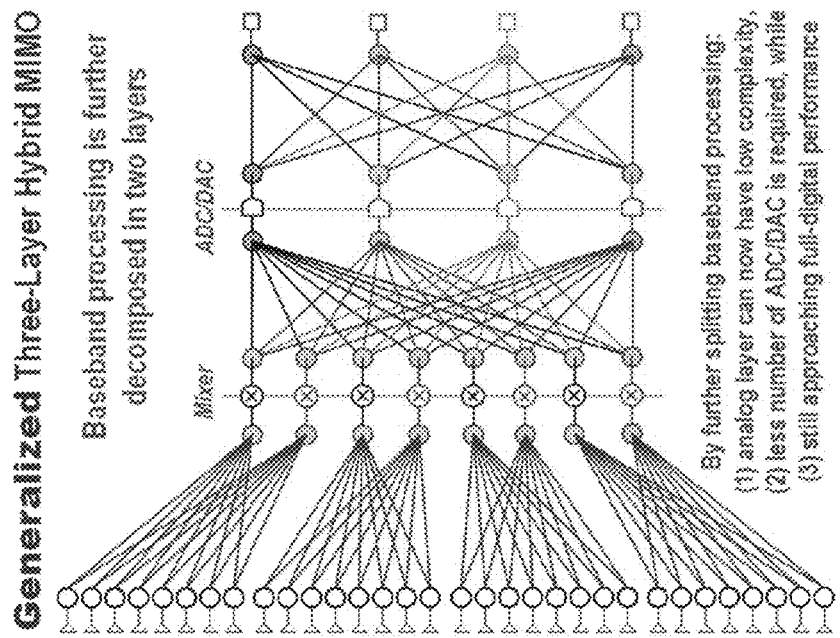
FIG. 1B shows three variations of the primary embodiment of the invention.
Figure 1B:
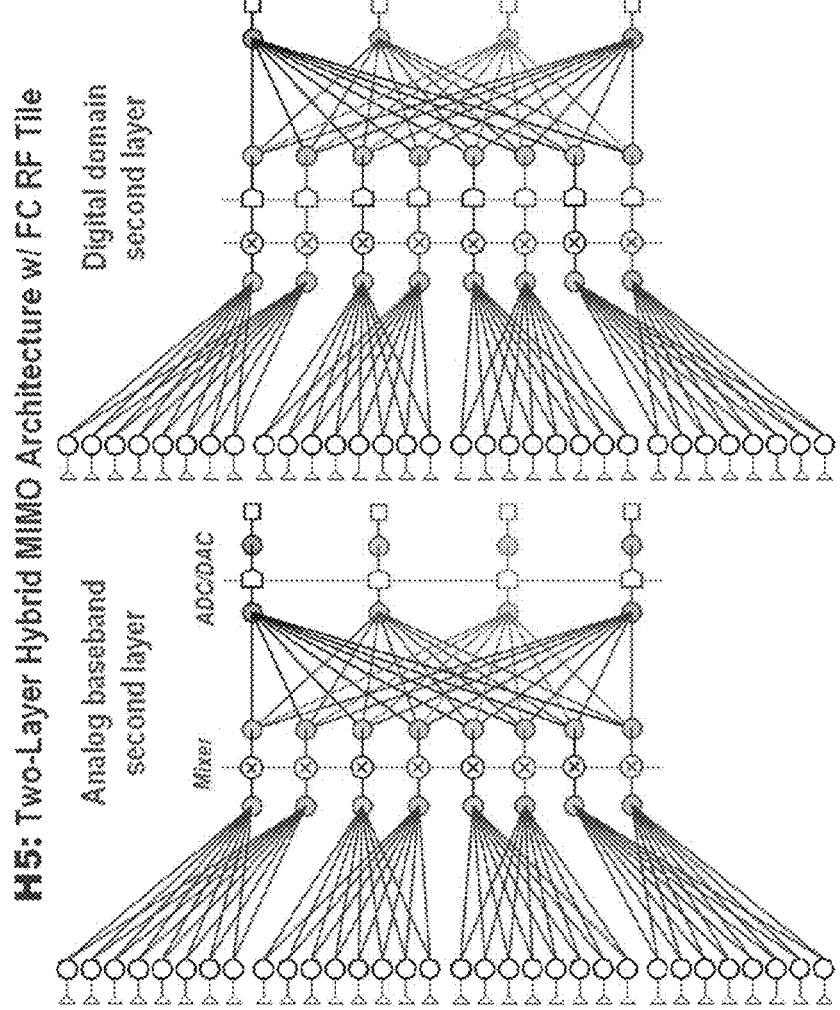

FIG. 1B shows three variants of the primary embodiment of the invention, the first variant is a two-layer hybrid architecture in which the baseband processing in the second layer occurs in the analog domain. The second variant is a two-layer architecture in which the baseband processing occurs in the second layer in the digital domain. The third embodiment is a generalized three-layer architecture in which the baseband processing occurs in a second, analog domain layer and a third, digital domain layer.

The two-layer MIMO operation can be understood intuitively from a simplified case of PC-tile two-stream RX architecture with $N_A$=8 and K=$N_{RF}$=$N_S$=2, as shown in FIG.

Figure 2:
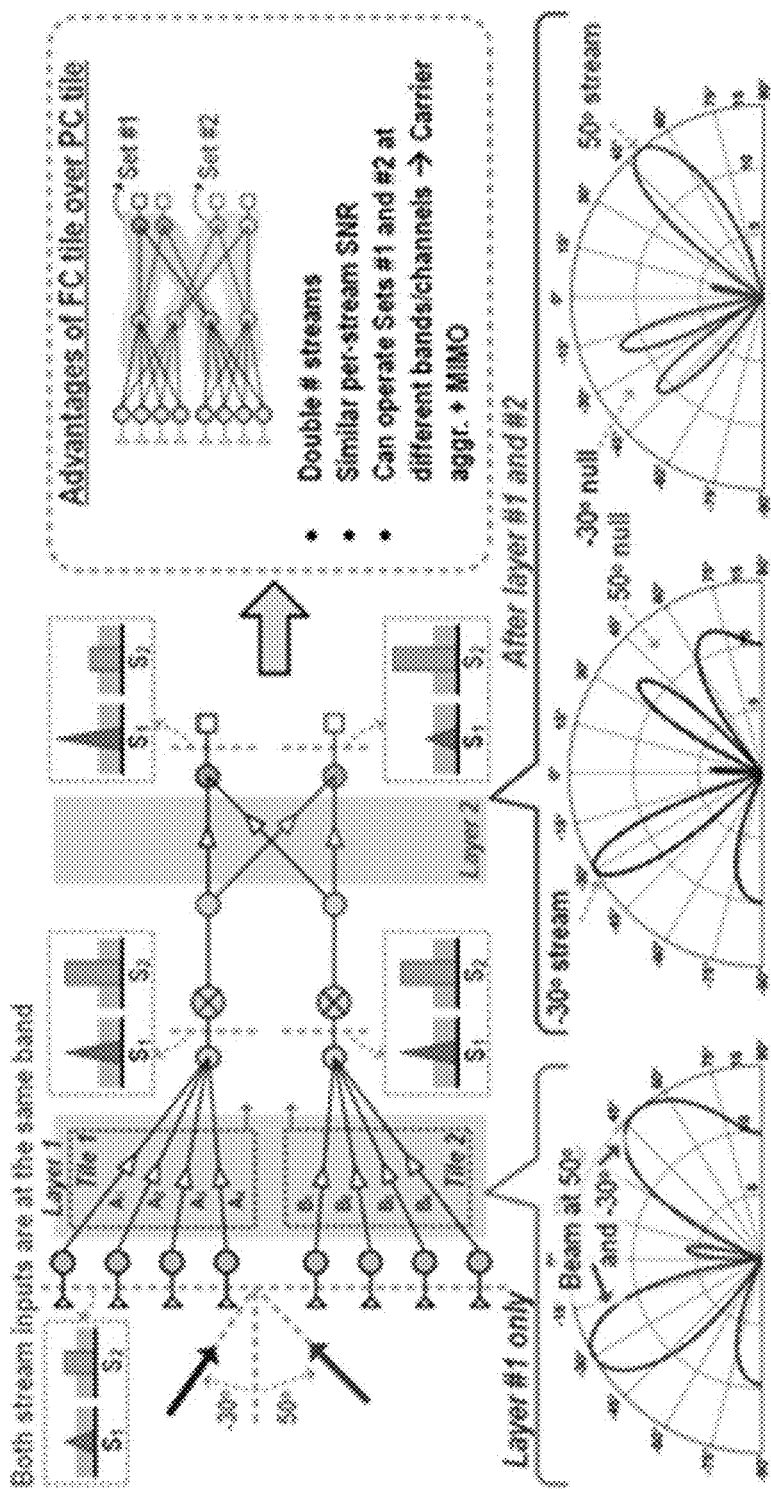
FIG. 2 is a schematic of a multi-layer HBF concept and an example for an eight-element two-stream architecture.

2. The spectra of two different incoming data streams from two separate angles of arrival are indicated in red and blue at various points in the signal path. The weights in each PC tile are set to synthesize a single composite array pattern that has two "main" lobes ($N_S$ main lobes in general for $N_S$ stream), each directed towards one incoming stream. Example beam patterns are shown in the bottom portion of FIG. 2. Hence, in the first layer, all tiles perform SNR improvement for all incoming streams, all tiles spatially filter out signals that have an angle of arrival other than all the streams and all tiles perform no cross-stream isolation. However, although all tiles receive all the streams, as many such tiles are present in the first layer, some spatial information remains that can be further utilized. Therefore, in the fully-connected analog/digital baseband second layer, the weights can be set to achieve spatial separation of streams, and hence, cross-stream cancellation (example beam patterns are shown) and further improvement of SNR by appropriately adding signals from multiple tiles. Similarly, a multi-layer PC-tile TX array operation can be understood as the following. Each tile sends out signals simultaneously in many different directions for many streams. Now, the input to each tile from baseband is already pre-processed in such a manner that each stream after cumulative effect from all tiles constructively adds in only one of the many transmit directions.

Multi-layer HBF architectures are not subject to the trade-off between different single-layer HBFs and offer the following advantages: (1) superior energy-efficiency as compared to DBF due to RF heavy processing and only a limited number of frequency translation stage; (2) lower design complexity than the H2 architecture due to the use of RF-tiles with only one/two streams; (3) better scalability than the H2 architecture both in case of $N_A$ and $N_S$ due to the modular tiled approach of RF processing; (4) superior spectral efficiency as compared to the H1 architecture; and (5) better design flexibility than all single-layer HBF architectures because of the second layer of baseband processing.

The use of low-complexity FC tiles instead of PC tiles in a multi-layer HBF architecture confers numerous advantages as follows: (1) As shown in the insert in FIG. 2, an FC-tile multi-layer HBF can support a higher number of streams compared to a PC tile, with each stream having the same performance as in the case of the PC tile. (2) Each stream in the FC tile can support different channels or bands, thereby enabling carrier-aggregation (CA) from the full aperture while also performing MIMO at each carrier. Full-aperture CA cannot be supported in the case of PC-tile. (3) The multi-layer HBF with FC tile enables front-end self-interference cancellation (SIC) that cancels the TX leakage in the RX path at RF on a per-element basis. Such SIC cannot be supported in a PC-tile.

Transceiver Architecture
Cartesian-Combining MIMO/Beamforming Receive Path

The receive path employs the Cartesian-combining architecture, which was first proposed for single-stream RF beamforming with homodyne down-conversion, and later extended to hybrid MIMO reception. A heterodyne embodiment having image filtering, but no image cancellation was demonstrated. A generalized heterodyne embodiment with reconfigurable image cancellation was also demonstrated; using a single LO generation sub-circuit in each downconversion chain that supported MIMO reception at either 28 GHz or 39 GHz, or concurrently in both bands.

In the present invention, the receive signal path is designed to support both the 28 and 39 GHz bands, either solely or concurrently. However, a direct conversion approach is adopted, thereby requiring a dedicated LO distribution circuit for each downconversion chain but avoiding the need for image-reject calibration.

Cartesian-Splitting MIMO/Beamforming Transmit Path

Figure 3A:
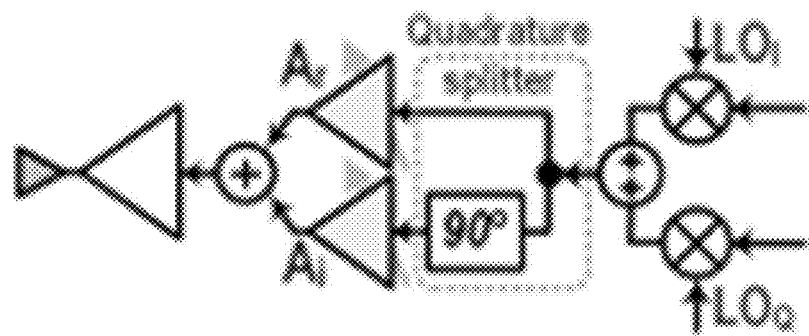
FIG. 3A is a schematic of a vector-modulator-based Cartesian phase shifting single-element transmitter.
Figure 3B:
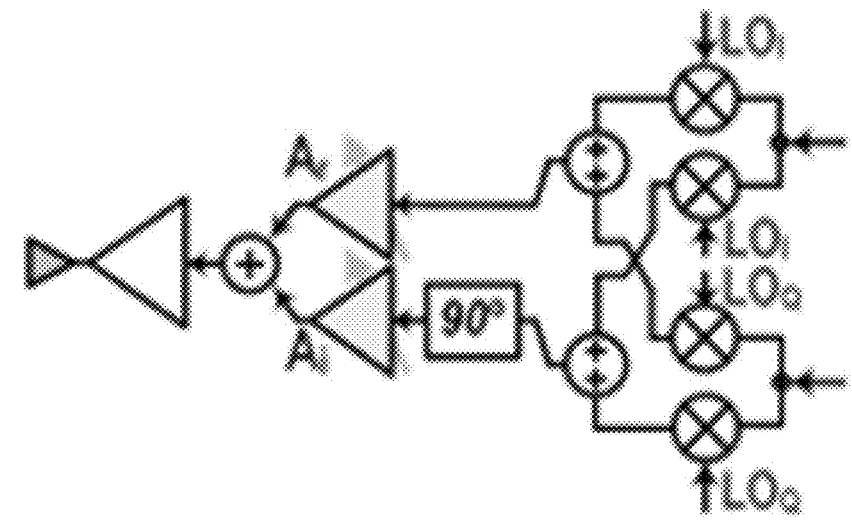
FIG. 3B is a schematic of a modified vector modulator architecture wherein RF splitting inside the quadrature splitter is translated to baseband.
Figure 3C:
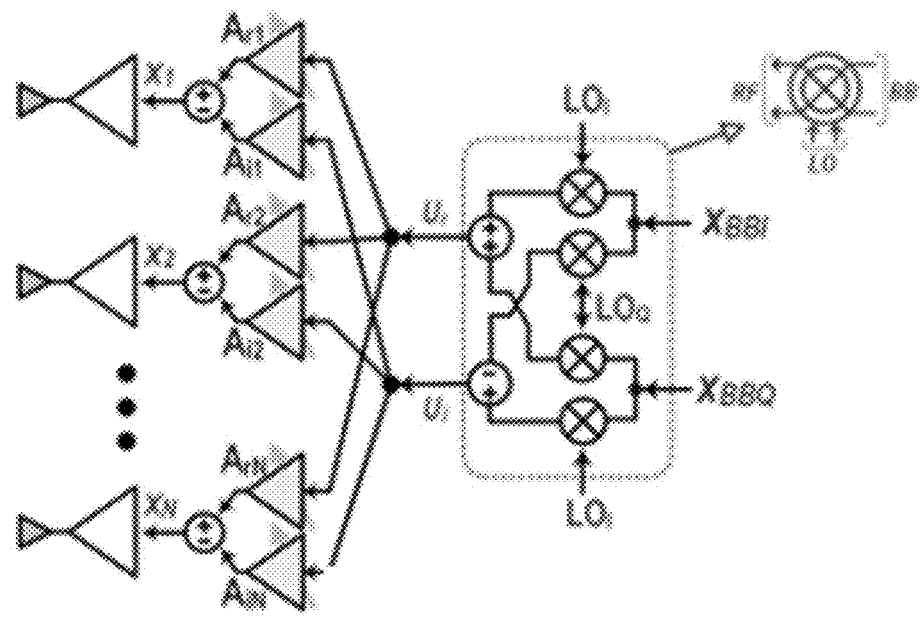
FIG. 3C is a schematic of a Cartesian-splitting-based beamforming transmitter architecture wherein a 90° phase shifter is absorbed in the LO path from RF.

The Cartesian-splitting beamforming transmitter architecture will now be disclosed. FIG. 3A shows a quadrature upconverter followed by a vector modulator complex-weighting circuit and a power amplifier driving an antenna element. One goal of the present invention is to eliminate the quadrature splitter, typically implemented as a quadrature hybrid or polyphase filter, from the signal path. This can be done by two transformations: first, by commutating the RF splitting and the quadrature upconversion operations, as shown in FIG. 3B, and, second, by absorbing the 90° phase shifter in the RF signal path into the LO ports of the mixers and appropriately modifying the connections of the LO phases, as shown in FIG. 3C. The Cartesian-splitting complex-weighting principle can also be understood mathematically. The complex baseband signal, $\tilde{x}_{BB} \equiv x_{BBI}(t) + jx_{BBQ}(t)$, is upconverted by a complex quadrature mixer, producing a complex-valued signal with real and imaginary parts $u_r(t)$ and $u_i(t)$ respectively:

$$u(t) = \tilde{x}_{BB}(t)e^{2\pi j f_{LO} t} \doteq u_r(t) + ju_i(t)$$

where:

$$u_r(t) = x_{BBI}(t)C - x_{BBQ}(t)S$$

$$u_i(t) = x_{BBI}(t)S + x_{BBQ}(t)C$$

$$C \equiv \cos(2\pi f_{LO} t)$$

$$S \equiv \sin(2\pi f_{LO} t) \quad (1)$$

In a phased array or partially-connected MIMO transmitter, each antenna must be driven by an independently complex-weighted signal. Thus, the signal driving the $k^{th}$ antenna (or the $k^{th}$ PA) can be generated by independently gain-scaling the real and imaginary parts and summing them together, as shown in Eq. (2a) below.

$$(2a): x_k(t) = A_r u_r(t) - A_i u_i(t) = Re[(A_r + jA_i)u(t)]$$

$$(2b) := Re[(A_r + jA_i)\tilde{x}_{BB}(t)e^{2\pi j f_{LO} t}]$$

$$= A_r \{x_{BBI}(t)C - x_{BBQ}(t)S\} - A_i \{x_{BBI}(t)S + x_{BBQ}(t)C\} \quad (2)$$

Equivalently, Eq. (2b) shows that the envelope of the bandpass signal $x_k(t)$ is equal to the complex baseband envelope scaled by a complex-valued weight $(A_r + jA_i)$. In practice, gain scaling of the real and imaginary parts can be implemented by a pair of programmable gain transconductors, while the summing can be implemented by combining their output currents.

Figure 3D:
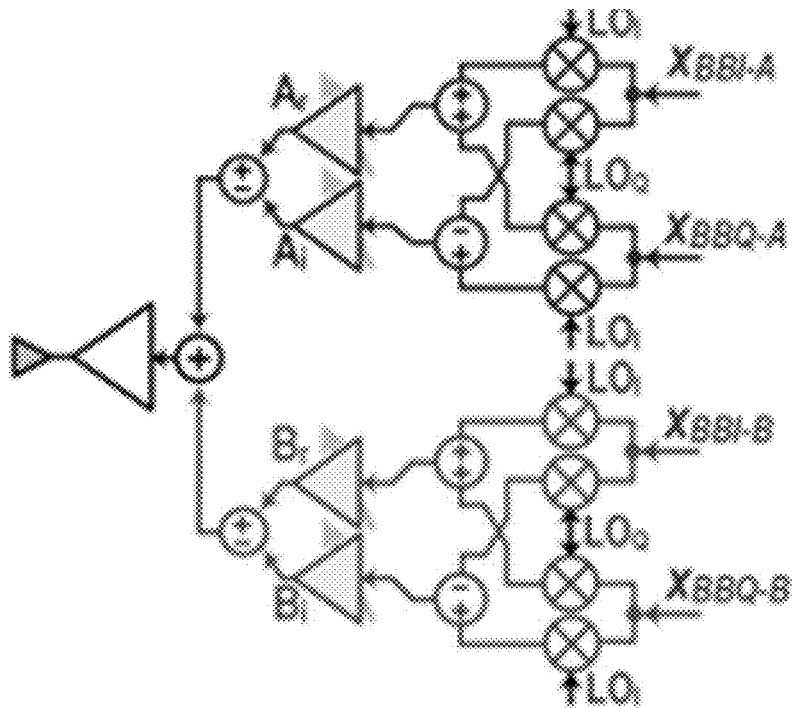
FIG. 3D is a schematic of a Cartesian-splitting-based phase shifting for one element and two baseband streams wherein one stream is shown in blue and the other steam is shown in red.

It is straightforward to extend the aforementioned principle to a fully-connected hybrid MIMO transmitter. As shown in FIG. 3D, for a single antenna in a two-stream FC-MIMO transmitter, a separate upconversion chain is required for each stream. To apply a complex weight for the $s^{th}$ stream to the $k^{th}$ antenna, the real and imaginary outputs of the $s^{th}$ chain are scaled with a pair of PGAs $A_{r,k,s}$ and $A_{i,k,s}$. The weighted streams are then summed together before the $k^{th}$ antenna. In the transmitter of to present invention, summing is done at the input of the $k^{th}$ PA; this signal can be written as:

$$x_k(t) = \text{Re}\left[\sum_{s=1}^{S}\{A_{r;k,s} + jA_{i;k,s}\}\tilde{x}_{BB,s}(t)e^{2\pi f_{LO}t}\right] \quad (3)$$

Bi-Directional MIMO Transceiver

Figure 4:
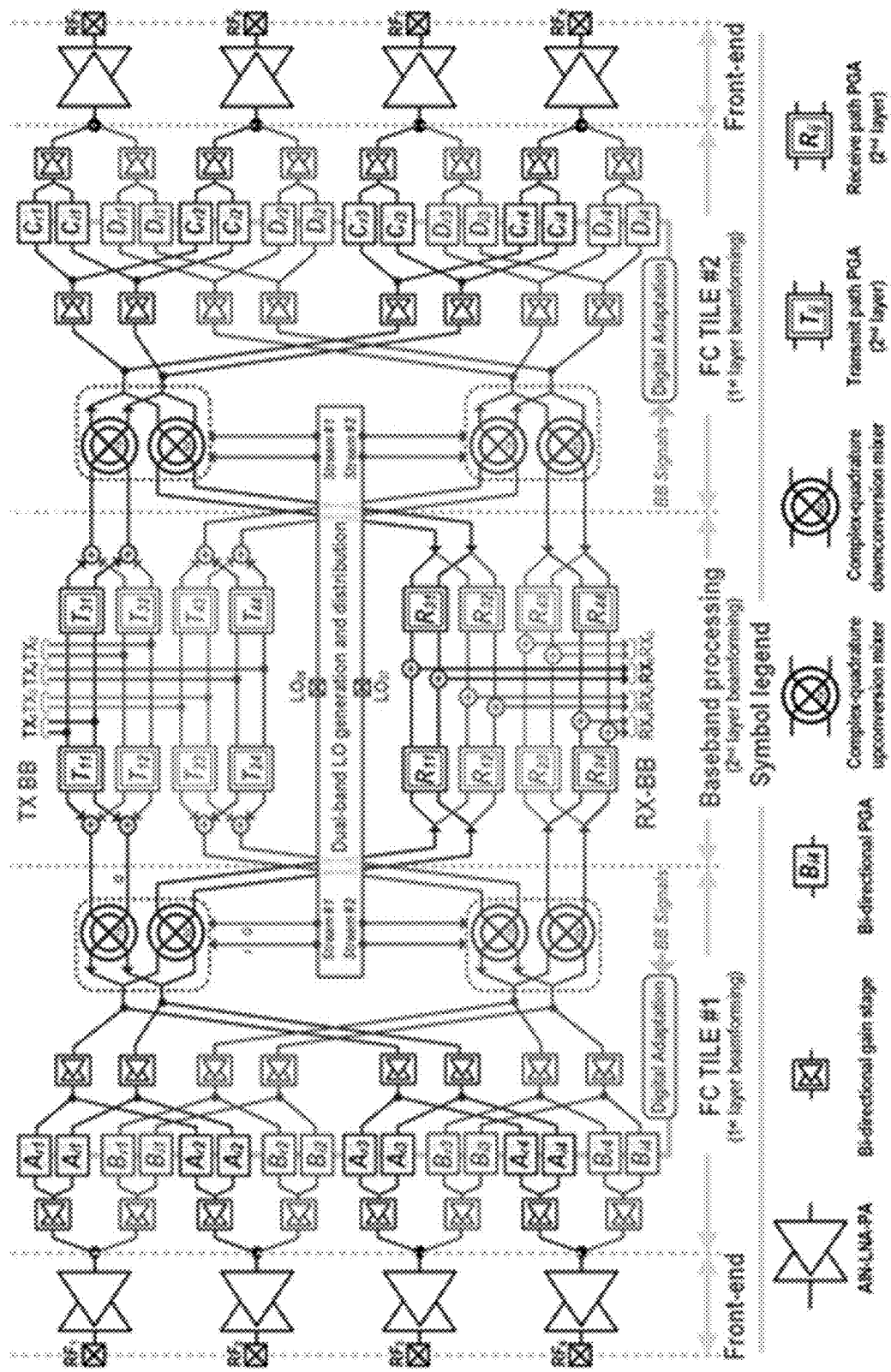
FIG. 4 is a simplified schematic of two-layer, eight-element, four-stream hybrid beamforming transceiver prototype in accordance with the present invention.

In the present invention, the Cartesian-combining receive path and Cartesian-splitting transmit path are combined to implement a hybrid MIMO/beamforming transceiver, which is shown schematically in FIG. 4. This circuit architecture has several advantages. First, it avoids the use of RF-domain phase shifters or quadrature hybrids that are often bulky, lossy, and narrowband. For each transmitter stream, the baseband circuitry and the upconversion chain is shared between all antenna elements. Thus, the overhead incurred in a Cartesian-splitting MIMO transmitter (relative to a single antenna transmitter) is a pair of PGAs. Second, high resolution, calibration-free, digitally programmable Cartesian complex-weighting with low gain and phase error can be implemented. Third, and most importantly, the weighting principle is inherently wideband, and can be realized at any frequency where the front-end PGAs achieve sufficient gain. Therefore, this architecture is well suited for wideband application, and also for dual-band application with widely separated frequencies.

Transceiver Prototype Design

A 28/37 GHz two-layer hybrid beamforming MIMO transceiver prototype with eight elements and four chains has been designed to demonstrate the concepts described herein. The prototype is of type H5, as shown in FIG. 1A and FIG. 1B, with parameters $N_A$=8, $K$=2, $N_{RF}$=4, and $N_S$=4. A simplified schematic is shown in FIG. 4. The first layer comprises two four-element, two-stream fully-connected tiles. In each tile, the antenna port is interfaced with two frequency conversion chains via front-end amplifiers and PGA's for complex-weighting. In the second layer, bi-directional spatial signal processing is performed at analog baseband. In the receive path, the four downconversion chains connect to Cartesian complex weights whose outputs represent the received streams (or a mixture of the received streams, with one stream dominant). In the transmit path, four analog baseband data streams are weighted, upconverted using four upconversion chains and applied to the first layer tiles The Cartesian-combing/splitting technique described in the previous section is used to perform RF-domain first-layer beamforming in each stream of the FC tile (the two streams in each tile are shown in red and blue in FIG. 4). In addition to its architectural advantages, the Cartesian-combining/splitting technique is well-suited to dual-band beamforming. This is because the RF-domain network is only based on programmable transconductors and current-mode combiners or voltage-mode splitters and can all be designed to have dual-band frequency response. The frequency translation chains in each tile can select either 28 or 37 GHz LO, thereby providing maximum re-configurability between carrier-aggregation and MIMO modes. Compared to the heterodyne image-reject dual-band beamforming architecture, which minimizes LO tuning range, the homodyne architecture is used here that is simpler, offers more flexibility in LO frequency selection and better cross-stream isolation at the expense of larger LO tuning requirement.

The prototype multi-layer HBF transceiver comprises the following blocks: (1) one LNA/PA dual-band bidirectional interface per element shared between the two streams in each tile, (2) dual-band bidirectional beamforming network with shared passives between the TX and RX path for compactness, (3) one homodyne complex-quadrature up/down conversion stage per stream, (4) dual-band LO generation and distribution network, (5) baseband TX and RX second layer analog domain processing, and (6) digital control and adaptation circuitry. Design considerations of the key blocks are described next.

LNA and Bi-Directional Antenna Interface Design

Figure 5:
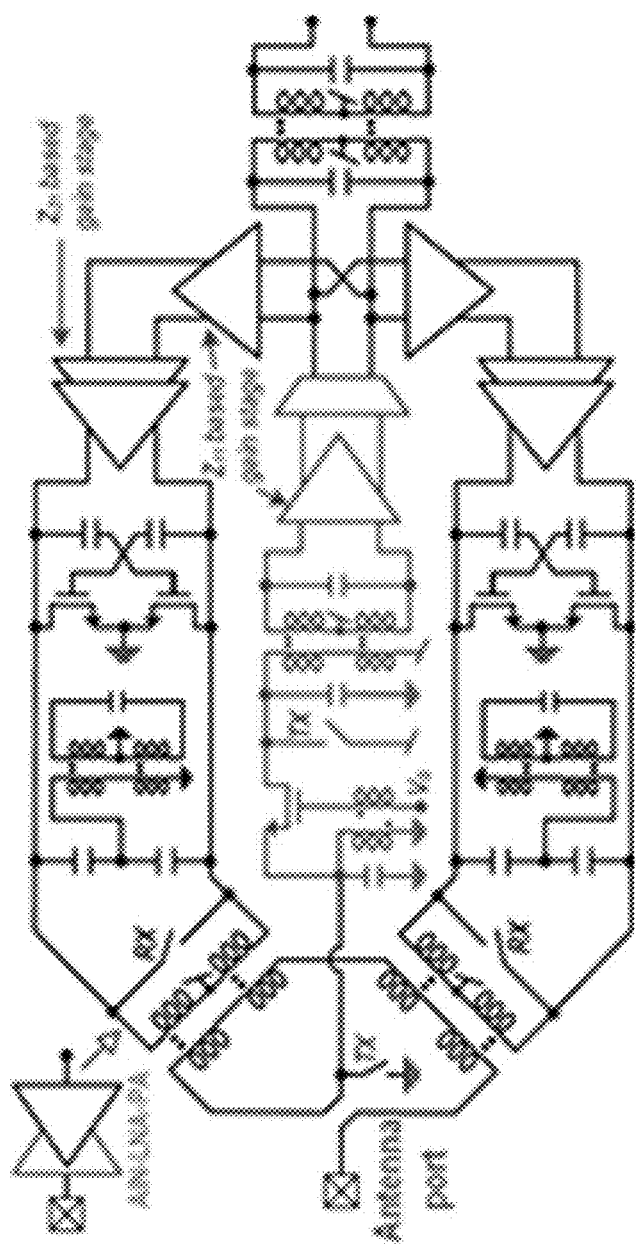
FIG. 5 is a schematic of dual-band, bi-directional front-end consisting LNA, PA and antenna interface switch.

Each RF signal port of the chip connects to a dual-band, bidirectional front-end circuit which interfaces an antenna element to the first beamforming layer, as shown in FIG. 4. The front-end, shown in FIG. 5, comprises a low-noise amplifier, a power amplifier, and an antenna interface network which combines a T/R switch function, a power combining function in transmit mode and an input matching function in the receive mode. The fully-connected first layer achieves better energy efficiency than a partially-connected type when PA's with better back-off efficiency than Class-A are used. Therefore, the PAs in the present front-end employ a two-way power combining topology with Class-B unit PA's in the output stage, each having a second harmonic shorting network; this enables better peak and back-off efficiency. The front-end can be switched between transmit and receive modes by means of three switches, as shown in FIG. 5. The output side series power combining network also constitutes input matching network to the LNA which uses a $G_m$-boosted common-gate input stage. All gain stages except the input LNA stage and the PA input stage use common-source differential pairs without a tail current source but with cross-coupled capacitive neutralization for improved differential mode stability. These stages use transformer coupled-resonator loads to obtain dual-band frequency responses. To equalize gains in the two bands, one gain stage in each of the LNA/PA paths uses driving port impedance ($Z_{11}$) load; all other stages use trans-impedance ($Z_{21}$) loads. In this prototype, the gain of the LNA is increased by adding an additional gain compensation stage that improves the overall gain by 4 dB in 28 GHz band and 11 dB in 37 GHz band.

First Beamforming Layer Network

Figures 6A, 6B:
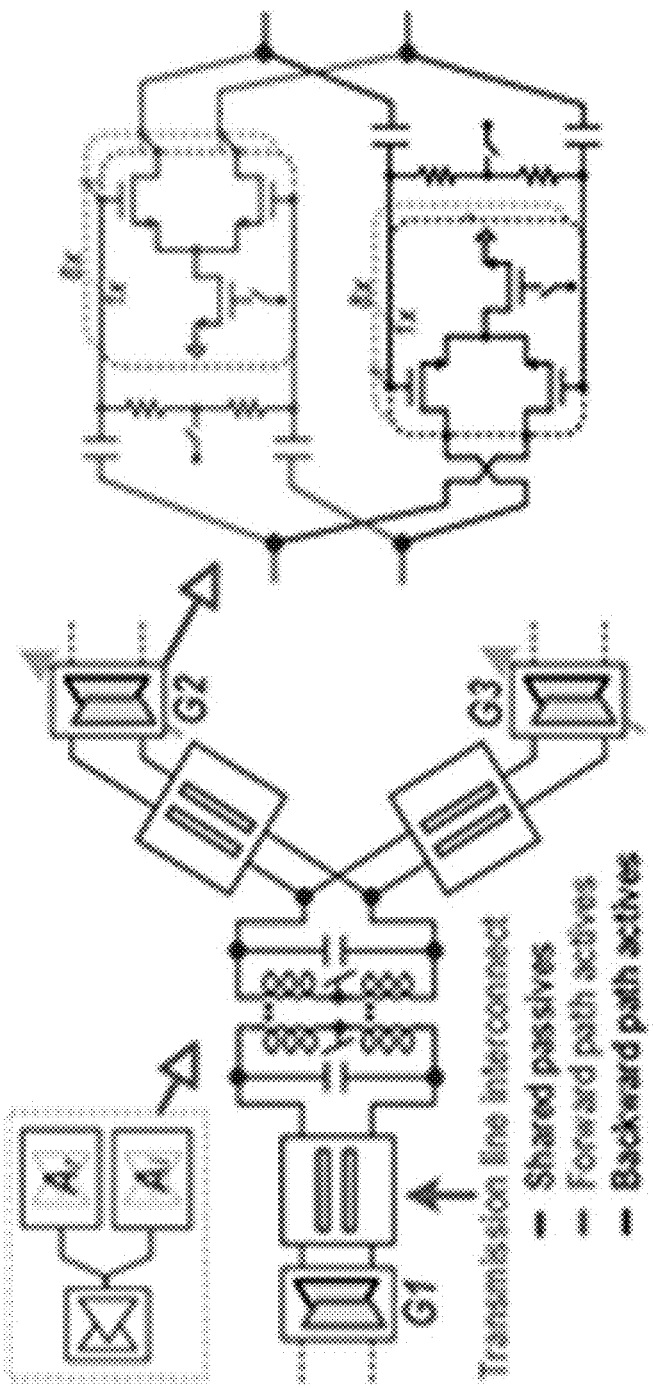
FIG. 6A is a schematic of a reconfigurable bidirectional splitting/combining network.
FIG. 6B is a schematic of a programmable bidirectional transconductor.

The RF-domain beamforming network in the first layer is constructed by combining bi-directional sections similar to FIG. 6A, following the system shown in FIG. 4. The section shown in FIG. 6A comprises three bidirectional transconductor stages (G1-G3) connected to a coupled resonator. Transconductors G1-G3 use cross-connected differential pairs one of which is turned ON for forward or reverse signal flow (in the complex-weighting sections, these are binary-weighted, digitally switched). Thus, the signal path can be reversed without having switches in the RF signal path, thereby improving losses and bandwidth. The secondary side of the coupled resonator serves as a voltage-splitter in receive mode (with G1-G3 in forward mode) and a current-combiner load in transmit mode (with G1-G3 in reverse mode). Using this structure in lieu of the traditional Wilkinson structure provides another advantage, namely that a third mode is available for current-mode self-interference cancellation for simultaneous transmit-receive operation where G1 and G2 are set in forward mode and G3 in reverse mode. Passive structures throughout the first-layer network are shared between the TX and RX signal paths in order to reduce die area. The resulting compactness also helps minimize interconnect losses, and hence overall power consumption.

Front-End and First Layer Frequency Response

Figure 7A:
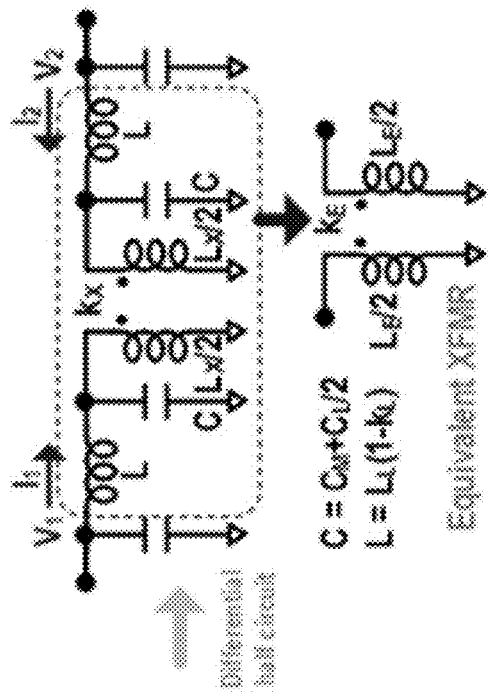
FIG. 7A is a schematic of a simplified lumped element model.
Figure 7B:
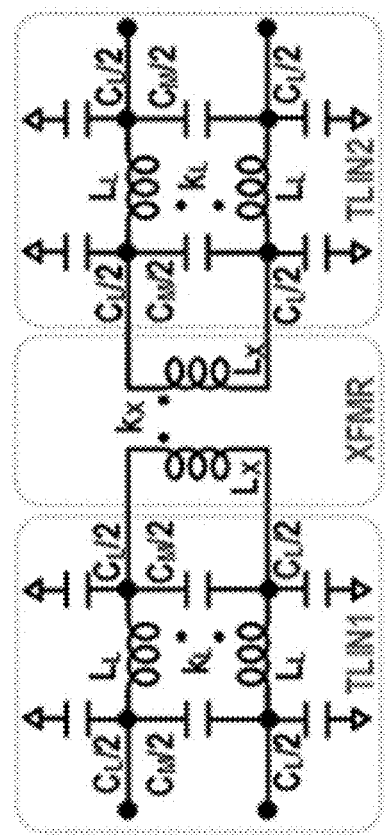
FIG. 7B is a schematic of a differential half circuit equivalent representation.
Figure 7C:
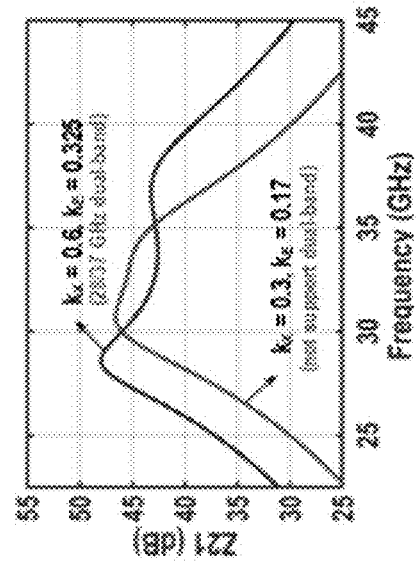
FIG. 7C is a graph showing effective coupling factor ($k_E$) and self-inductance ($L_E$)
Figure 7D:
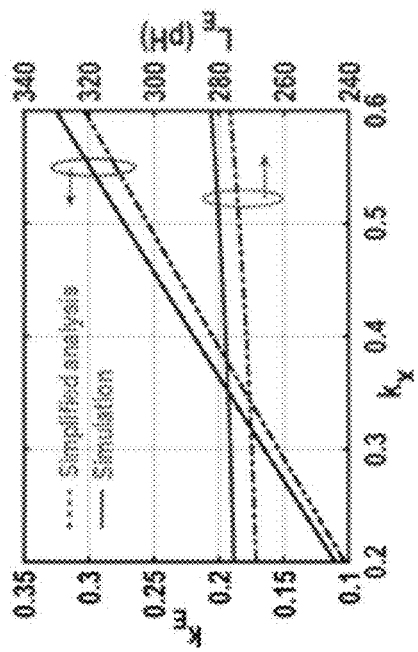
FIG. 7D is a graph showing transimpedance ($Z_{21}$) amplitude response for $k_X$=0.6 and $k_X$=0.3.

The front-end and the first-layer beamforming network is designed to support concurrent operation in the 28 and 37 GHz bands. Their frequency responses are tailored by adjusting the coupling coefficient (and hence the poles) of the coupled resonators. A moderate coupling factor ($k_X$=0.25-0.35) is chosen for the coupled-resonators in the LNA/PA stages. In the beamforming network, however, the presence of relatively long transmission lines (100-300 um) between the active circuits and the coupled resonators loads lead to somewhat different design considerations, as discussed next. Specifically, a substantially higher coupling coefficient ($k_X$=0.4-0.6) is required to achieve the requisite dual-band frequency response. The design approach starts with analysis using lossless lumped-element models for the transmission line interconnect (parameters $L_L$, $k_L$, $C_L$, and $C_M$) and the transformer (parameters $L_X$ and $k_X$). The circuit is shown schematically in FIG. 7A, and its differential-mode half-circuit equivalent is shown in FIG. 7B. The voltages $V_1$, $V_2$ and currents $I_1$, $I_2$ in FIG. 7B are related as follows:

$$V_1 = S\left[L + \left(\frac{L_X}{2}\right)\left(\frac{F_1}{F_2}\right)\right]I_1 + S\left[k_x\left(\frac{L_X}{2}\right)\left(\frac{1}{F_2}\right)\right]I_2 \quad (4)$$

$$V_2 = S\left[k_x\left(\frac{L_X}{2}\right)\left(\frac{1}{F_2}\right)\right]I_1 + S\left[L + \left(\frac{L_X}{2}\right)\left(\frac{F_1}{F_2}\right)\right]I_2$$

where:

$$F_1 = 1 - \omega^2\left(\frac{CL_X}{2}\right) \times (1 - k_X^2)$$

$$F_2 = \left[1 - \omega^2\left(\frac{CL_X}{2}\right)(1 + k_X)\right]\left[1 - \omega^2\left(\frac{CL_X}{2}\right)(1 - k_X)\right]$$

If the circuitry inside the blue dashed rectangle in FIG. 7B is represented as an equivalent transformer with coupling factor of $k_E$ and self-inductance of $L_E/2$, it can be derived from Eq. 4) that:

$$L_E = 2L + L_X \times \left(\frac{F_1}{F_2}\right)$$

$$k_E = \frac{k_X}{F_1 + F_2 \times \frac{2L}{L_X}}$$

(5)

Therefore, in the presence of the transmission lines, the effective transformer coupling factor is reduced, and self-inductance is increased. FIGS. 7(C, D) illustrate an exemplary scenario where two 240 um transmission lines are symmetrically connected to a transformer ($L_X$=100 pH and $k_X$ is tunable). The transmission line interconnect is first simulated using a field solver and its lumped element parameters are extracted as $L_L$=155 pH, $k_L$=0.52, $C_M$=15 fF, and $C_L$=40 fF. It can be seen from FIG. 7C that the simulated $L_E$ and $k_E$ variation with $k_X$ closely matches the simplified analysis in Eq. (5). As further verified in FIG. 7D, the transimpedance of the composite transmission line and transformer system with moderate coupling coefficient ($k_X$=0.3) has low bandwidth since the effective coupling coefficient is low ($k_E$=0.17). On the other hand, the system can be made to operate as a dual-band load when a relatively high coupling factor $k_X$=0.6 is chosen, which results in moderate effective coupling ($k_E$=0.325).

Frequency Translation Chain Design

Figure 8A:
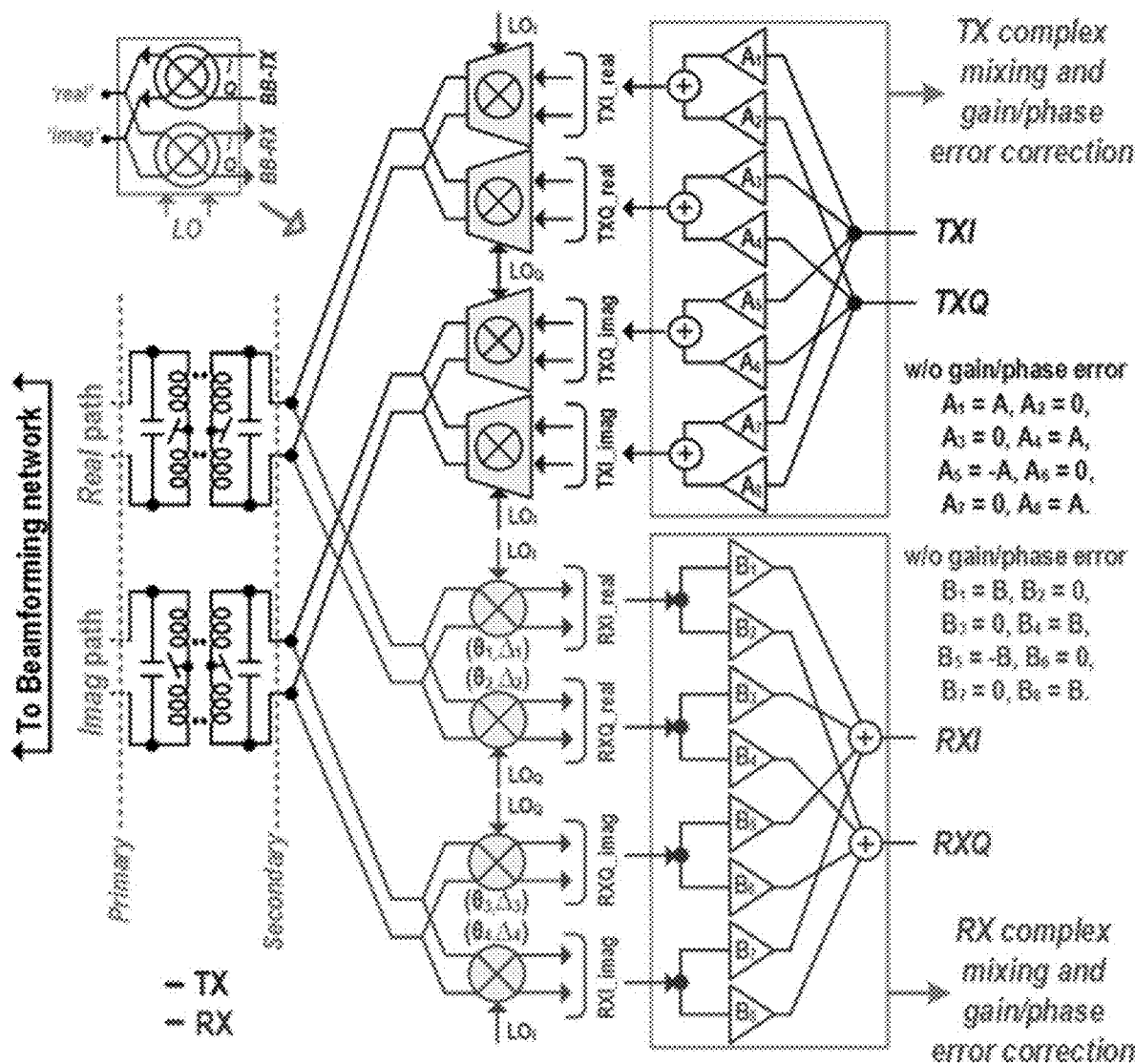
FIG. 8A is a schematic for a bi-directional complex quadrature mixer.
Figures 8B, 8C:
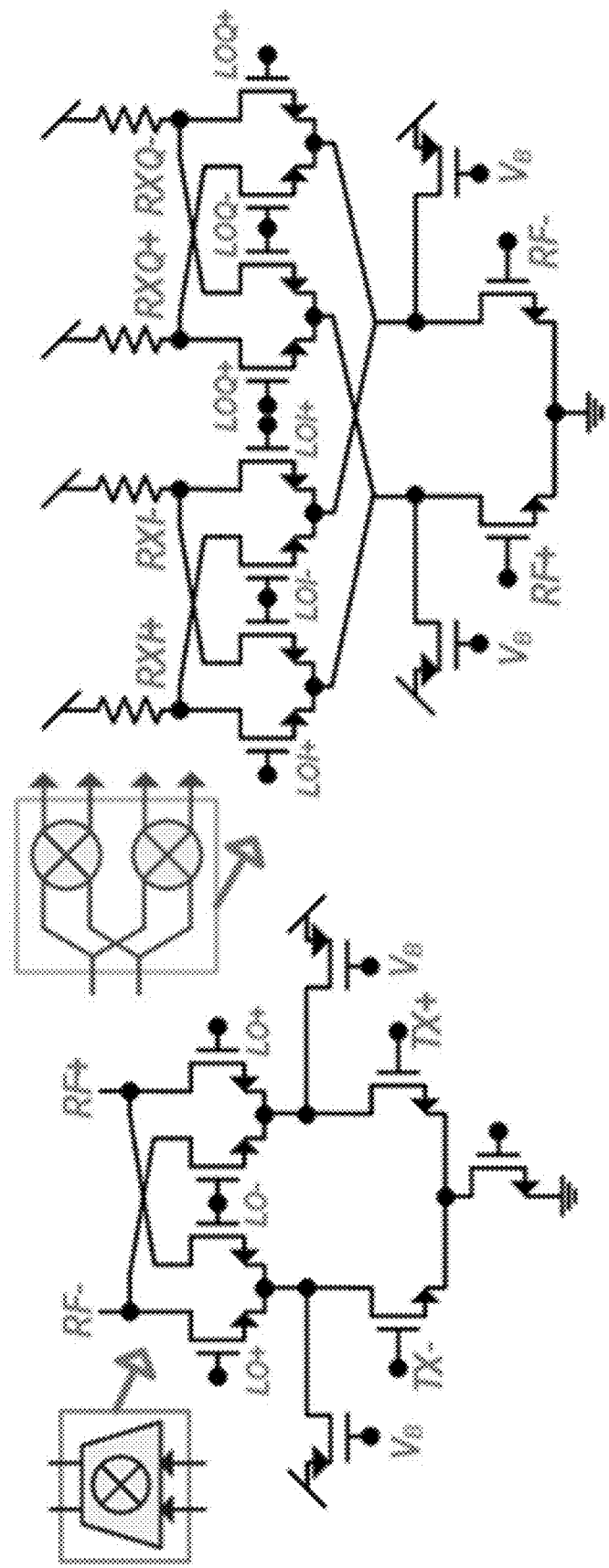
FIG. 8B is a schematic for an up-conversion mixing core w/o the load inductor.
FIG. 8C is a schematic of a quadrature downconversion mixer.

FIGS. 8A-C show a detailed schematic of the bi-directional complex quadrature mixing stage. In each tile, the up- and down-conversion mixing paths are connected to the beamforming network by a pair of coupled resonators (one each for the real and imaginary paths). The primary port of each coupled resonator connects to the bidirectional transconductors in the beamforming network. The secondary port of each coupled resonator acts as a load of a quadrature up-conversion stage, and also as a splitting node to a quadrature downconversion stage.

The downconverted outputs of the quadrature mixer pairs in the receive path are weighted ($B_1$-$B_8$ in FIG. 8A) and summed to generate baseband quadrature outputs. The weights $B_1$-$B_8$ serve two purposes: first, to perform the output summing operation required to complete Cartesian-combining in the first beamforming layer; and second, to correct for gain and phase errors. The nominal $B_1$-$B_8$ values in the absence of gain/phase errors are shown in FIG. 8A. Including gain errors ($\Delta_1$-$\Delta_4$) and phase errors ($\theta_1$-$\theta_4$) of the four down-conversion mixing paths, the $B_1$-$B_8$ values are given below:

$$B_1 = \frac{\cos\theta_2}{\Delta_1 C_1} \quad (6)$$

$$B_2 = \frac{-\sin\theta_2}{\Delta_1 C_1}$$

$$B_3 = \frac{\sin\theta_1}{\Delta_2 C_1}$$

$$B_4 = \frac{\cos\theta_1}{\Delta_2 C_1}$$

$$B_5 = \frac{-\cos\theta_4}{\Delta_3 C_2}$$

$$B_6 = \frac{-\sin\theta_4}{\Delta_3 C_2}$$

$$B_7 = \frac{-\sin\theta_3}{\Delta_4 C_2}$$

$$B_8 = \frac{\cos\theta_3}{\Delta_4 2}$$

where:

$$C_1 = \cos(\theta_1 - \theta_2)$$

$$C_2 = \cos(\theta_3 - \theta_4)$$

This scheme can correct for several types of gain/phase errors ($\theta_1$-$\theta_4$/$\Delta_1$-$\Delta_4$) including: (1) quadrature gain/phase error between the I and Q LO paths, (2) gain/phase error within the two I paths or the two Q paths of the LO, and (3) gain/phase error between the real and imaginary signal paths.

Similar to the RX path, the $A_1$-$A_8$ weights in the TX path are applied to the baseband I/Q data streams to perform complex mixing and gain/phase error correction before being input to the upconversion mixers. The transistor level schematic for the up-conversion mixing core (excluding the load transformer) and the quadrature down-conversion mixer are shown in FIG. 8B and FIG. 8C, respectively. Current steering is used in both the up- and down-conversion mixing stage to improve linearity and noise performance.

Dual-Band LO Generation and Distribution Network

Figure 9:
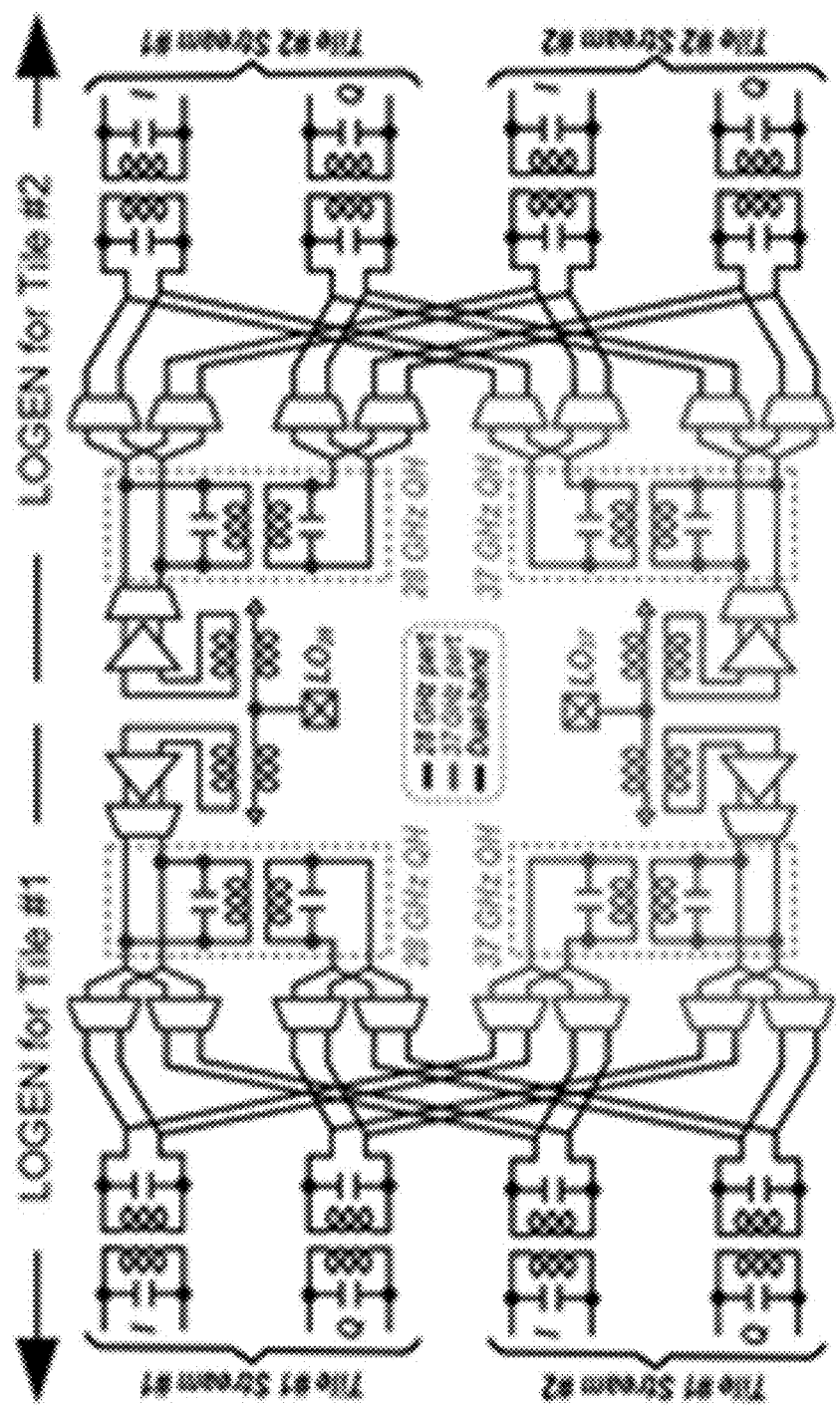
FIG. 9 is a dual-band quadrature LO generation and distribution network for the two-tile four-stream MIMO HBF transceiver shown in FIG. 4.

Because this transceiver employs direct conversion in both frequency bands, the LO distribution circuitry must have a frequency response that covers both bands. Moreover, because is desirable for the band for each stream (i.e., each up/downconversion pair) to be independently selectable, dedicated LO generation/distribution units are necessary for each stream. In this transceiver, LO synthesis circuitry is not included. However, it accepts a single-ended LO signals in the 28 GHz and 39 GHz, from which differential-quadrature signals appropriate for feeding the active mixers shown in FIG. 8B are generated and distributed. The LO subsystem is shown in FIG. 9. The 28 and 39 GHz LO inputs are converted to differential using baluns, then buffered and fed to coupled resonator quadrature hybrids (CRQH). In contrast to other quadrature generation methods, the CRQH's are extremely compact, have low loss and easily implemented in differential form. The limited bandwidth over which the CRQH maintains 90° phase difference is not an issue here because the CQRH can be tuned with along the LO frequency. In this transceiver, separate CRQH's are used for each band. The voltage outputs of the CRQH's are buffered by transconductors terminated in dual-band coupled resonator loads, as shown in FIG. 9. The LO fed to a particular stream is selected to either the 28 or 39 GHz by switching on or off the appropriate buffer transconductor.

Second (Baseband) Beamforming Layer Design

Figures 10A, 10B:
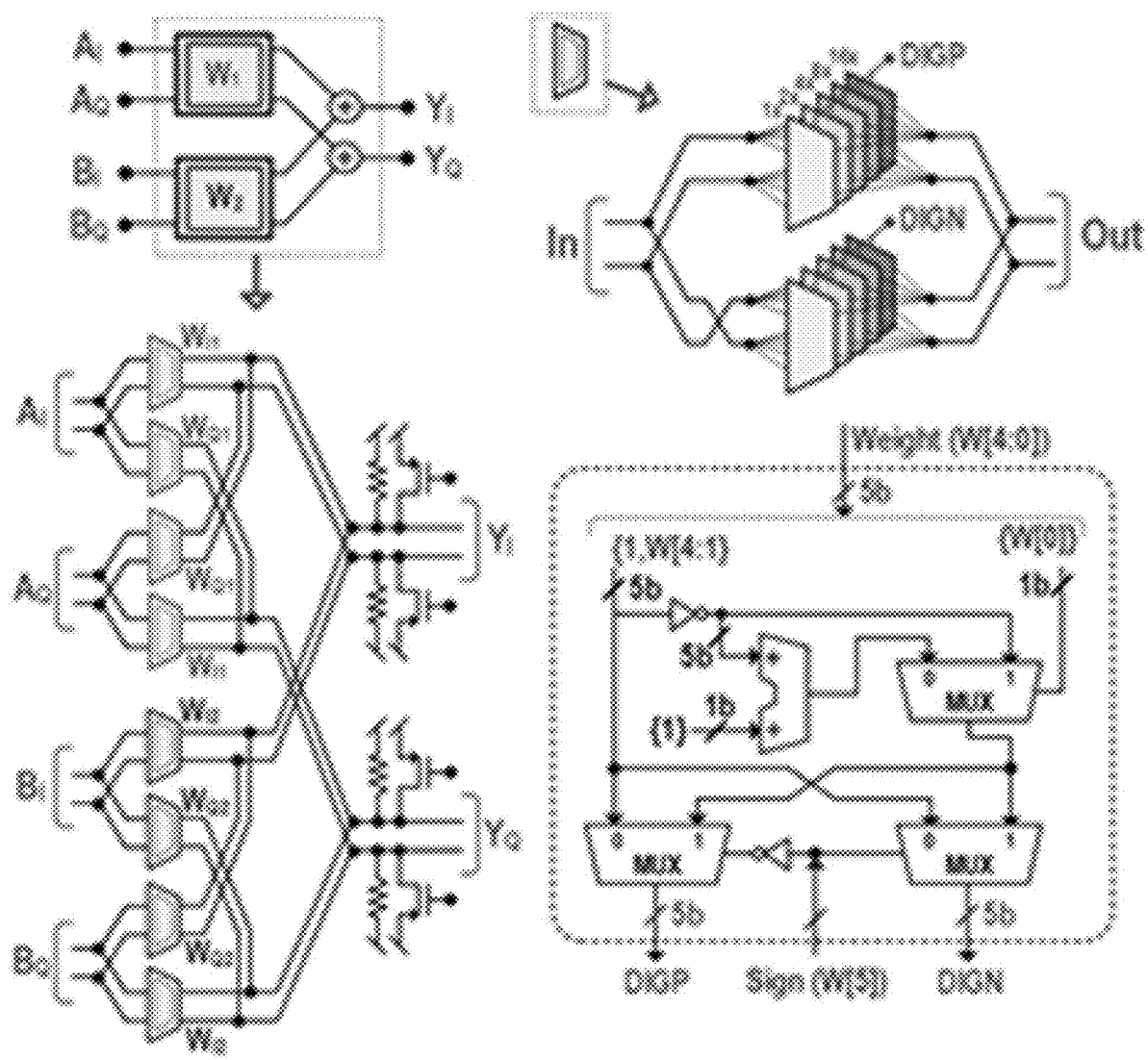
FIG. 10A is a schematic of a baseband cartesian complex weighting and combining.
FIG. 10B is a schematic of a programmable sign-switchable transconductor that maintains the input and output impedance and quiescent current consumption across the tuning range.

Cartesian Baseband Beamforming: The second beamforming layer uses separate Cartesian complex weights at baseband for the transmit and receive paths (See FIG. 4). A detailed schematic of a section of the second beamforming layer is shown in FIG. 10A, where Cartesian complex weights are applied to two baseband streams and their outputs summed together, in accordance with the architecture of FIG. 4. Each complex weight is realized using four programable transconductors whose output currents are combined with appropriate polarity, as shown in FIG. 10A. In-phase and quadrature components of output currents from two such complex weights are summed together and converted to voltage using resistive loads (which use current bleeding to set the common-mode level). Each programable transconductor has 6-bit (including sign bit) binary gain control, thereby enabling fine resolution baseband beamforming.

New PGA Architecture: An improved topology was sought for the programmable transconductor due to the large number of such cells and to achieve high complex weighting accuracy over all possible settings. Desirable attributes of a programmable transconductor include precise linear increments, constant input/output capacitances and output resistance (to ensure phase invariance across settings), low hardware overhead and constant output common-mode voltage. The phase-invariant topology has the first two attributes. However, to present constant input capacitance, the design uses additional analog circuit blocks. Moreover, its common-mode voltage is a function of the gain setting. To overcome these limitations, the topology shown in FIG. 10B was developed, along with a digital encoding scheme that ensured constant capacitance, output resistance and DC current.

The proposed transconductor is a binary-weighted array of cross-connected differential pairs. Each cell in the array can be turned on or off by switching the bias of that cell's tail current source. A digital controller controls how the cells are turned on or off, according to an algorithm discussed next. Suppose the desired weight is represented as W, and the digital controls for the positive and negative polarity cells are DIGP and DIGN, respectively. Let the maximum value of DIGP or DIGN be N. The controller selects a set of value for DIGP or DIGN such that:

DIGP−DIGN=W $$DIGP+DIGN=(N) \text{ or } (N+1) \tag{7}$$

That is, the total number of turned-on cells is roughly constant (with an unavoidable one LSB variation) across the entire tuning range (+N to −N). The solution to Eq. (7) can be shown to be the following:

$$DIGP = \left\lfloor \frac{N+1+W}{2} \right\rfloor \tag{8}$$

$$DIGN = \left\lfloor \frac{N+1-W}{2} \right\rfloor$$

Consider two example cases with W=31 and W=−15, where N=31. According to Eq. (7), the DIGP and DIGN values for the first case is 31 and 0 respectively, and, for the second case, is 8 and 23, respectively. Based on the above design strategy, as the total turned-on cells only vary by one LSB, the input capacitance, output impedance, and DC current variation are also bounded to one LSB variation between the on and the off cell. The digital control circuitry that implements the functionality in Eq. (8) is shown in FIG. 10B.

System Considerations for Full-Duplex (FD) Beamforming (BF) Operation

Simultaneous transmit-and-receive (STAR) systems can be classified into the frequency-division duplex (FDD) type or the full-duplex (FD) type. In both classes, leakage of the large transmit signal can severely corrupt the weak received signal. Suppression of self-interference (SI) can be achieved by a combination of signal isolation and signal cancellation. In the FDD case, some isolation is naturally available because the transmit and receive signals occupy different frequency bands. This mechanism is not available in FD systems, which makes the FD case significantly more challenging. In both cases, isolation is most simply achieved by using separate antenna transmit and receive arrays. SI cancellation, on the other hand, can be implemented by introducing weighted and/or filtered replicas of the transmit signal to successively cancel the SI at various points along the receive path.

SIC Dimensionality Reduction for Phased Array System

Figures 11A, 11B:
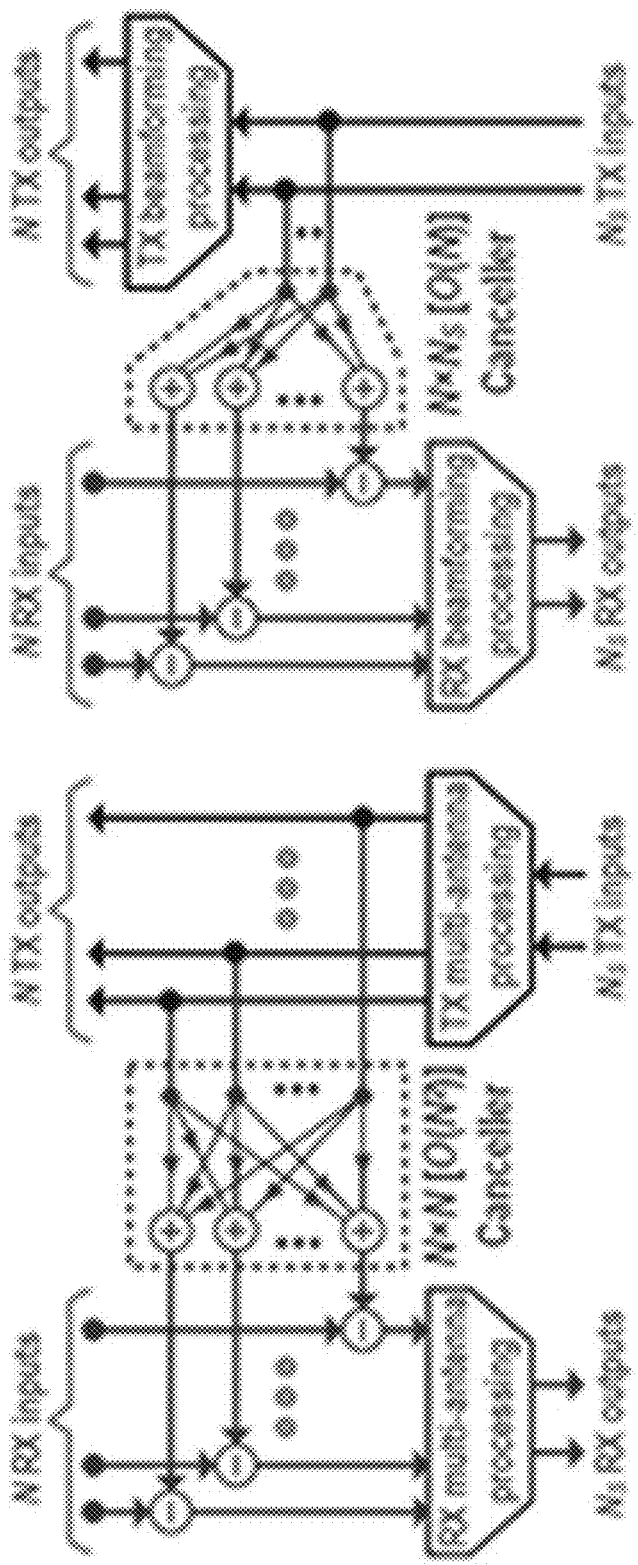
FIG. 11A is a schematic of a STAR system for multiple TX and RX antennas.
FIG. 11B is a schematic of a STAR system for phased array antennas.

In a multi-antenna system with $N_S$ streams and N TX and RX antennas, as shown in FIGS. 11A-B, TX output from $j^{th}$ element can be represented as:

$$X_j(t) = \sum_{k=1}^{N_S} x_k(t) A_{k,j} e^{j(\omega_{RF} t + \psi_{k,j})} \tag{9}$$

where:

$\omega_{RF}$ is the operating frequency; and $A_k$ and $\psi_k$ are gain and phase shifts applied to $k^{th}$ stream.

For STAR system, the aggregated TX leakage at $i^{th}$ RX antenna can be represented as:

$$I_i(t) = \sum_{j=1}^{N} \left[ |L_{ij}| e^{-j\psi_{ij}} \left( \sum_{k=1}^{N_S} x_k(t - \Delta_{ij}) e^{j(\omega_{RF} t + \psi_{k,j})} \right) \right] \tag{10}$$

Now, to cancel the TX leakage perfectly, it can be shown that full MIMO cancellation is required (see FIG. 11A) with one independent canceler from each TX element to each RX element $C_{ij}$ as the following:

$$I_i(t) = \sum_{j=1}^{N}[C_{ij} * X_j(t)] \Rightarrow C_{ij} = |L_{ij}|e^{-\psi_{ij}}\left(\delta(t-\Delta_{ij})e^{j\omega_{RF}\Delta_{ij}}\right) \quad (11)$$

The cancellation scheme shown in the above equation and in FIG. 11A has a number of cancellation coefficient scales with $N^2$ that makes it impossible to realize for massive antenna array systems. Moreover, the traditional way of performing RF cancellation from TX output to RX input is also not possible to implement for massive antenna arrays because of extremely complex RF routing requirement.

However, in case of phased array systems where TX and RX antennas are closely packed with $\lambda/2$ spacing, the group delay variation of the TX leakage across antenna array is minimal and $\Delta_{ij}(d_{ij}, \theta_{ij})$ for $i^{th}$ RX and $j^{th}$ TX antenna pair can be approximated as $\Delta_o$ ($d_A$, $\theta_A$). Therefore, aggregated leakage of Eq. (10) can be approximated as:

$$I_i(t) \cong \sum_{k=1}^{N_S}\left[x_k(t-\Delta_o)e^{j\omega_{RF}t}\sum_{j=1}^{N}\left(|L_{ij}|e^{-j\psi_{ij}} \times A_{k,j}e^{j\psi_{k,j}}\right)\right] = \quad (12)$$

$$\sum_{k=1}^{N_S}[C_{k,i} * x_k(t)(e^{j\omega_{RF}t}] \Rightarrow C_{k,i} = \delta(t-\Delta_o)\sum_{j=1}^{N}|L_{ij}|A_{k,j}e^{j(\psi_{k,j}-\psi_{ij}+\omega_{RF}\Delta_o)}$$

The above equation shows that phased array system cancellation can be performed by injecting on independent cancellation term from each TX streams to each RX antenna, as shown in FIG. 11A. Therefore, the cancellation complexity scales with O(N) and no direct RX feeding from TX output to RX input is required. Herein is disclosed a circuit architecture that intelligently realizes cancellation scheme in FIG. 11B with low hardware overhead. The current implementation is limited to one stream and can be scaled up flowing the system concept shown in FIG. 11B.

Full-Duplex Beamforming with Three-Step Self Interference Cancellation

Figure 12:
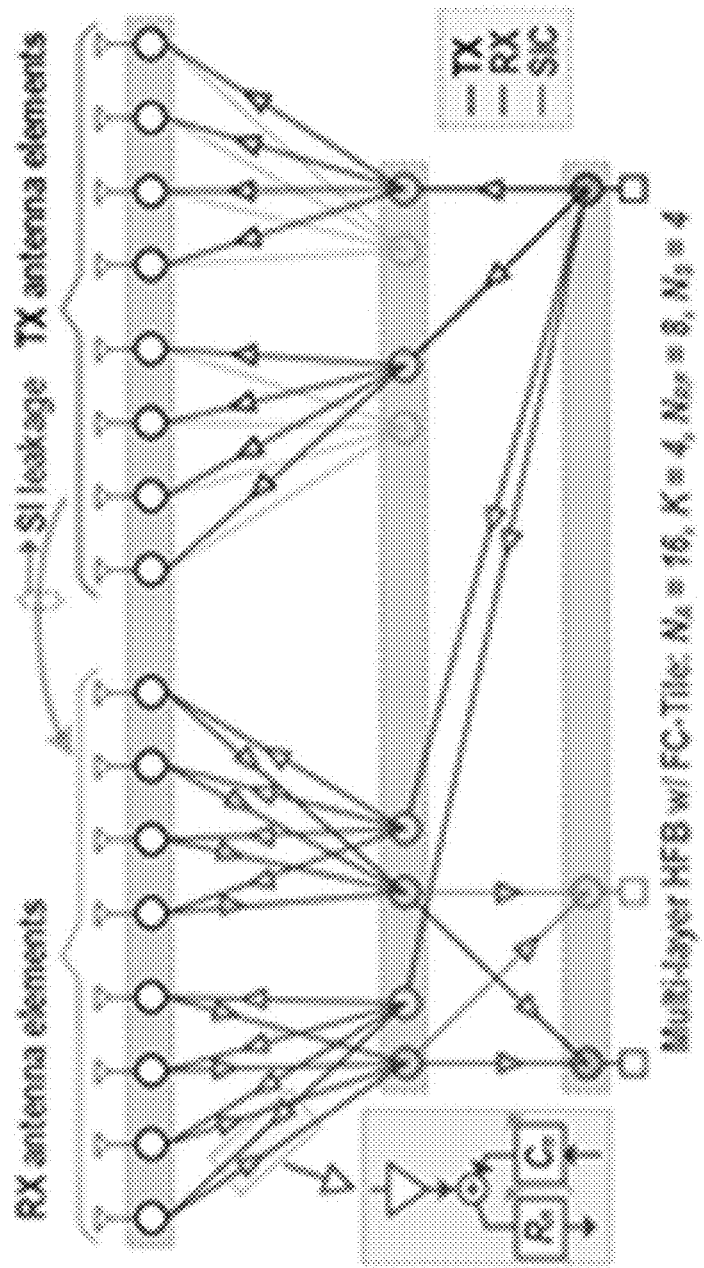
FIG. 12 is a schematic of a simultaneous transmit and receive beamforming architecture. The example shown is for a 16-element antenna array consisting four FC-tiles.

The STAR beamforming system shown in FIG. 12 includes separate TX antenna array (TX path is shown in blue), separate RX antenna array (RX path is shown in red), and a built-in per-element SIC mechanism (SIC path is shown in green). The FC-HBF architecture enables the built-in SIC mechanism to support a STAR operation where half of the array is configured in single-stream TX mode and the other half is configured in single-stream RX mode. The second available stream in the RX array is configured in the TX mode to inject a copy of the TX signal after independent complex weighting in each path to perform per-element SIC. Such SIC, and hence such STAR operation, is only available in an FC-HBF and not in PC-HBF. The multi-layer HBF architecture previously discussed herein, also supports such STAR operation if FC tiles are used in the first stage. Moreover, as shown in FIG. 12, in a multi-layer architecture, because multiple baseband RX outputs are available, MIMO operation can be supported in the RX array along with STAR operation. Please note that, although the TX array has multiple available streams to performs MIMO, as only one independent SIC stream is available in the RX array for two-stream FC tiles, cancellations for both TX streams would not be possible. Hence MIMO in the TX path can only be performed along with SIC for both streams if FC-tile with more than two-streams are used.

Figure 15:
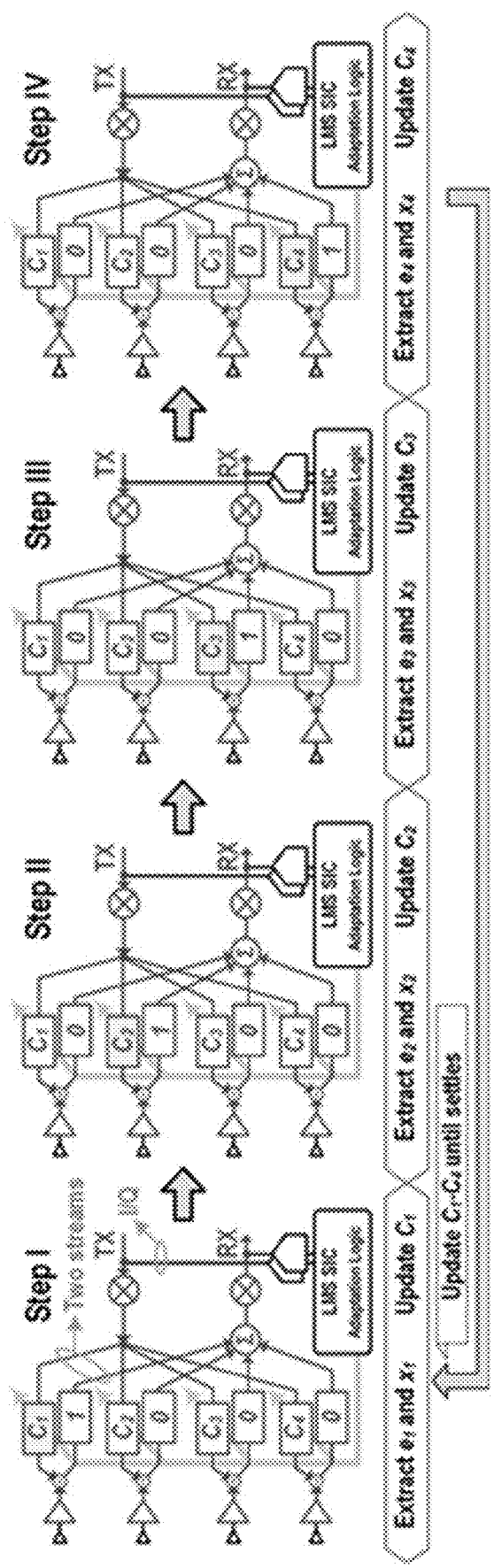
FIG. 15 is a schematic for an LMS-based RF-domain per-element SIC weight adaptation with time-multiplexed error extraction. SIC adaptation is shown for four RX elements.

Disclosed herein is a successive SIC mechanism is introduced for the STAR beamforming system, as shown in FIG. 15, that performs RF-domain cancellation in three steps.

Step #1—Per-Element SIC

Figure 13:
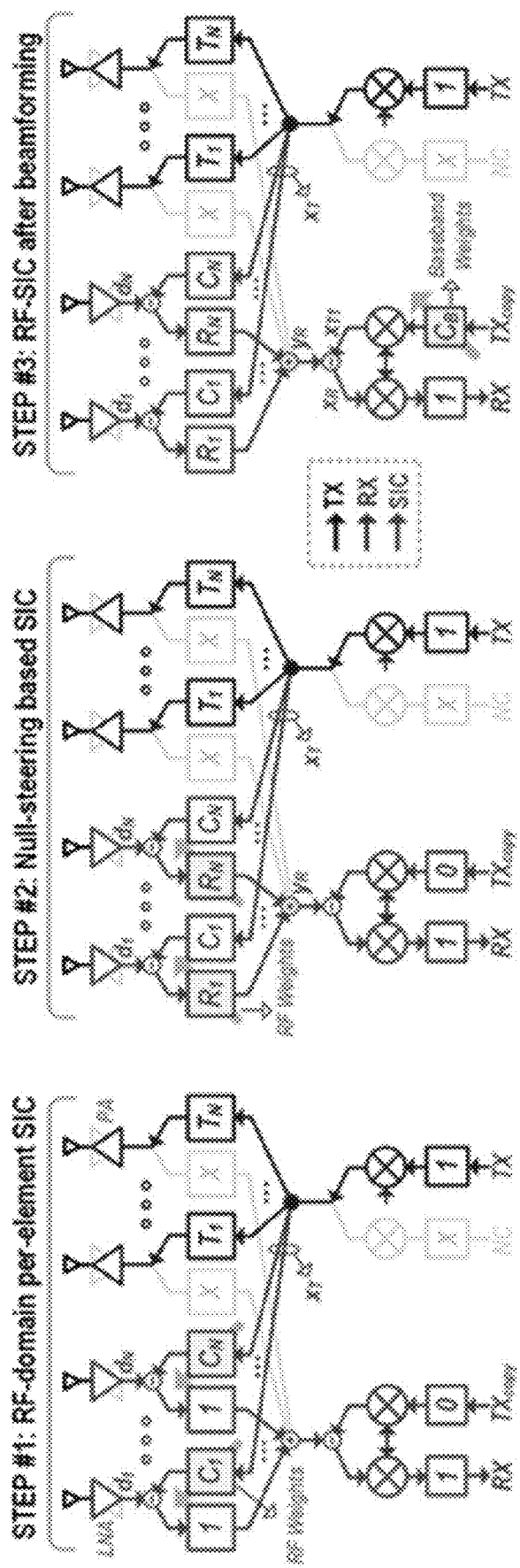
FIG. 13 is a schematic of a STAR beamforming system consisting N TX antennas and N RX antennas with three-step successive self-interference cancellation (SIC) mechanism: the RF-domain per-element SIC before RX beamforming, null-steering based SIC in the RX beamforming, and RF-SIC after RX beamforming.

The first SIC step is most important since it cancels the leakage earliest in the RX path. As shown in FIG. 13, in the first SIC step, one stream in the RX beamformer is used to inject complex-weighted TX signals independently at the output node of each LNA. Assume that the baseband equivalent representation of complex signals at the n-th LNA output is $d_n$ and at the per-element SIC input is $x_T$. The signal $d_n$ has two parts: the desired receive signal $r_n$ and the TX leakage interference $i_n$. Now, in the first step, the SIC weights $C_1$-$C_N$ should be set to reduce SI for each element as below.

$$\min_{C_n} |i_n - C_n x_T|^2 \text{ for all } n \in (1, N) \quad (13)$$

Because the SIC signal in the first step is approximated using only a single un-delayed complex tap, this step can only cancel SI with small group delay.

Step #2—Null-Steering SIC

In the second SIC step, the beamforming degrees of freedom in the RX array are used to minimize the residual SI after beamforming. Hence, the beamforming weights are set so that the desired signal SNR is maximized and the residual SI is minimized, thereby improving overall signal-to-interference-ratio. For desired RX output symbols $s_R$, second step SIC weights $R_1$-$R_N$ should be set based on the Eq. (14):

$$\min_{[R_1,\ldots,R_N]} \left|S_R - \sum_{n=1}^{N}R_N(d_n - C_n x_T)\right|^2 \text{ where } d_n = r_n + i_n$$

(14)

In the null-steering operation, SI signals that have similar group delays are used to cancel each other by beamforming. Therefore, the second cancellation step can cancel for wider signal bandwidth. Please note that the on-chip RF-domain adaptive null/beam steering technique, can be followed here to perform autonomous adaptation of second step SIC weights based on Eq. (14).

Step #3—RF-SIC after Beamforming

In the third SIC step, another SIC signal is injected after the RF-domain RX beamforming at the input of the down-conversion stage. For TX copy $x_{T1}$, the third step SIC weights $C_B$ should be set based on the Eq. (15):

$$\min_{C_B} \left|S_R - \left\{\left(\sum_{n=1}^{N}R_n(d_n - C_n x_T)\right) - C_B x_{T1}\right\}\right|^2 \quad (15)$$

As the thirst step SIC weight is implemented in analog or digital baseband, a multi-tap filter can be used (including delayed tap) in the SIC path, thereby enabling cancellation for SI leakage even with large group delay. The cancellation weight $C_B$ can also be adapted using LMS criterion.

Note that all aforementioned SIC's are performed in the RF domain, and additional SIC can be performed in the analog and digital domain.

Full-Duplex Beamforming Circuit Architecture

Figure 14:
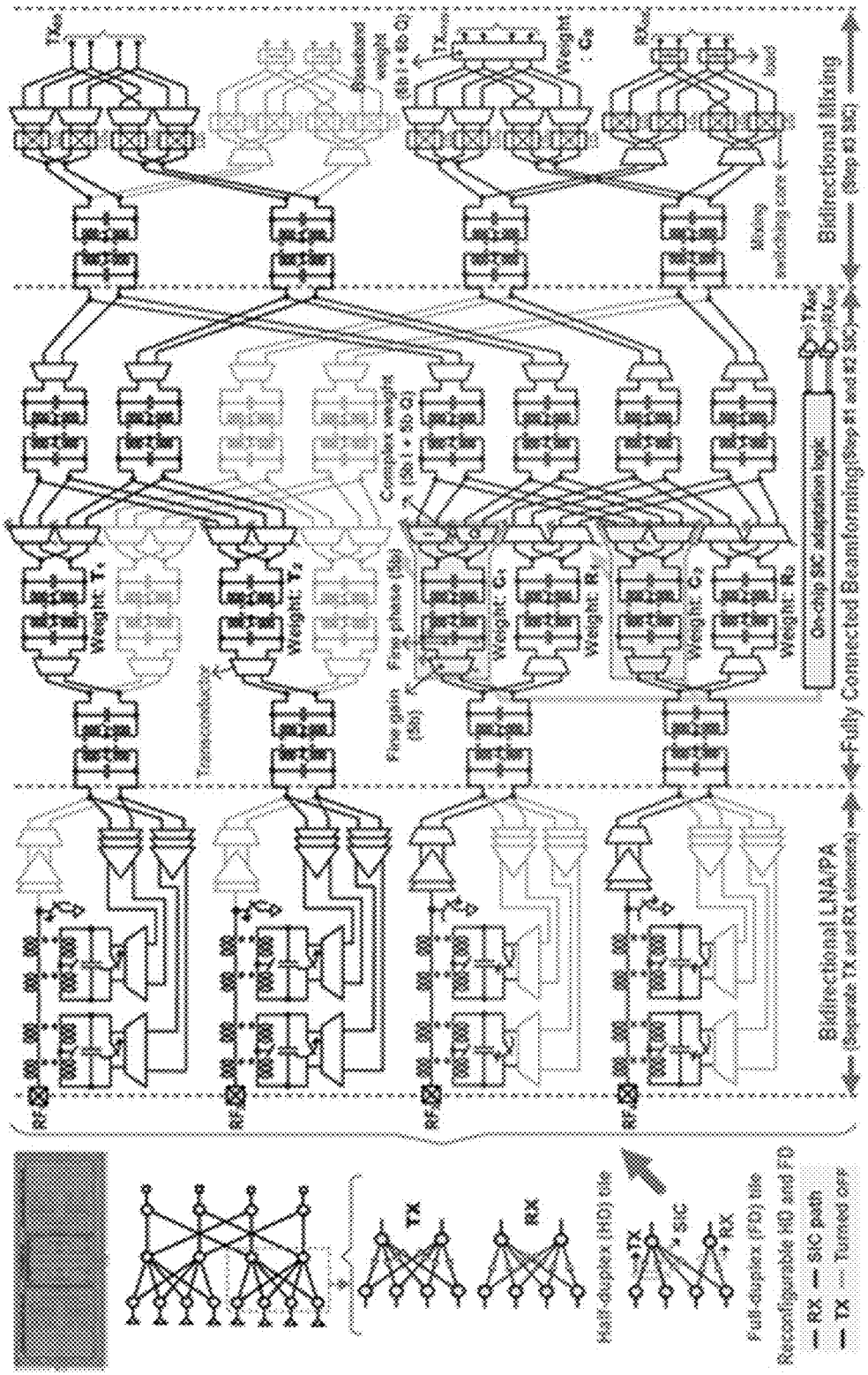
FIG. 14 is a schematic for a full duplex prototype with three-step cancellation shown for four elements. Circuit architecture is reconfigurable between half-duplex MIMO mode and full-duplex mode.

A 28/37 GHz fully connected hybrid beamforming MIMO transceiver prototype was developed to demonstrate full-duplex operation with three-step self-interference cancellation. The prototype consists of eight elements that are segmented into two tiles, each with four-element two-stream fully connected beamforming. The prototype uses a fully bidirectional signal path where each element can be configured as either TX or RX. Each stream for each element (every element is connected to two beamforming streams) can be configured either to transmit or to receive. This extremely flexible circuit architecture, shown in FIG. 14, allows two-stream half-duplex mode operation as well as can be reconfigured to full-duplex operation with built-in three-step SIC without any additional hardware. Therefore, the same circuit can be reconfigured to one of the two system modes (help duplex or full duplex) based on the link SNR. The circuit architecture uses homodyne Cartesian splitting/combining based hybrid beamforming for compactness and dual-frequency operation. The circuit schematic for only a four-element tile is shown in FIG. 14 where two elements are configured as TX (shown in blue), two elements as RX (shown in red), and the second stream in the RX array as SIC (shown in green). The unused blocked are powered down and shown in gray.

First Step SIC

First step SIC weight has two parts: (1) coarse grain Cartesian weight; and (2) fine-grain polar weight. The Cartesian weight is implemented based on the Cartesian splitting beamforming approach with 5-bit (including sign bit) resolution for both the I and Q path. To get much finer complex weighting resolution, addition polar RF weights are used that consists of one 5-bit (excluding sign) addition programmable gain amplifier for gain control and 5-bit phase control. The fine phase control is implemented using a digitally controllable capacitor bank in the coupled resonator tank, as shown in FIG. 14, and can perform phase tuning with <0.5° resolution and ~15° dynamic range. The first step SIC current signal is injected in the secondary port of the coupled resonator load whose primary port is connected to the forward path LNA final stage.

Second Step SIC

The second SIC step is based on beamforming in the RX array. The beamforming weights are implemented using the Cartesian combing approach with the same weighting principle as the first step SIC, i.e., 5-bit I/Q Cartesian weights, and additional 5-bit fine gain and 5-bit phase weight configured in the receive mode.

Third Step SIC

The third SIC step is implemented using baseband Cartesian complex weight with 6-bit resolution in both the I and Q path. The up- and down-conversion Cartesian based complex mixing stages have independent hardware for bidirectional operation, and only one of them is turned on for TX or RX operation. Hence, the up-conversion mixer hardware is already available in RX stream, which is repurposed as third step SIC in this circuit architecture without requiring any extra hardware. The SIC current is injected at the input of the mixer at one port of a coupling resonator, similar to the first SIC step.

Least-Mean-Square-Based RF-Domain SIC Adaptation

The per-element SIC weight in the first step canceller can be dynamically computed under a minimum-mean-square-error criterion to minimize the residual SI using an LMS algorithm. The LMS-based SIC weight update algorithm can be expressed as:

$$C(k+1) = C(k) - \mu \nabla_C \left[ \sum_{i=1}^{N} |d_i(k) - C_i(k)x(k)|^2 \right] = C(k) + 2\mu[d(k) - C(k)x(k)]^* x(k) \quad (16)$$

where:

$\mu$ is the adaptation rate;

$C(k)$ is the cancellation weight;

$x(k)$ is the transmitted symbol; and the $d(k)$ vector is the leakage input to the RX array at the kth time instance.

Eq. (16) indicates that, to compute the updated weight of each RX element's canceller, access to the error signal (i.e., the residual SI after the per-element cancellation) for each receive element is required. However, because the received signals from all RX elements are combined before down-conversion and digitization in an FC-HBF-based STAR beamforming system (as in FIG. 13), the baseband equivalent error signal for each RX element is not available to the SIC adaptation engine. Here we propose a time-multiplexed error-extraction scheme that breaks this requirement.

Time-Multiplexed Error Extraction

The time-multiplexed error-extraction scheme shares a similar underlying concept with the time-multiplexed LMS beam adaption. In the time-multiplexed SIC scheme, each row of the vector equation (Eq. (16)) that corresponds to one antenna path can be computed at a separate time instance sequentially. The error signal for each antenna path can, therefore, be sequentially extracted by setting the RX beamforming weight of the corresponding path to unity and the other paths to 0, as shown in FIG. 15. Therefore, in the time-multiplexed SIC scheme, one full adaptation cycle requires N-baseband cycles for N RX elements (shown in FIG. 15 for four RX antennas). In this design, the sign-sign-LMS scheme is implemented for simplicity, where a pair of I/Q comparators are used to extract the TX signal and the RX error (shown in FIG. 16A for single element]. The comparator and the digital SIC engine are strobed at opposite clock edge to provide half the time period of the baseband clock to the digital and the analog portions to settle. A shortfall to the time-multiplexed SIC scheme is that the adaptation time increases with the number of RX elements. This can be improved by using our proposed scalable, tiled HBF architecture with FC-tile, where the adaptation rate can be improved by K-times for K RX tiles.

One-Step Non-Ideality Correction

Figure 16B:
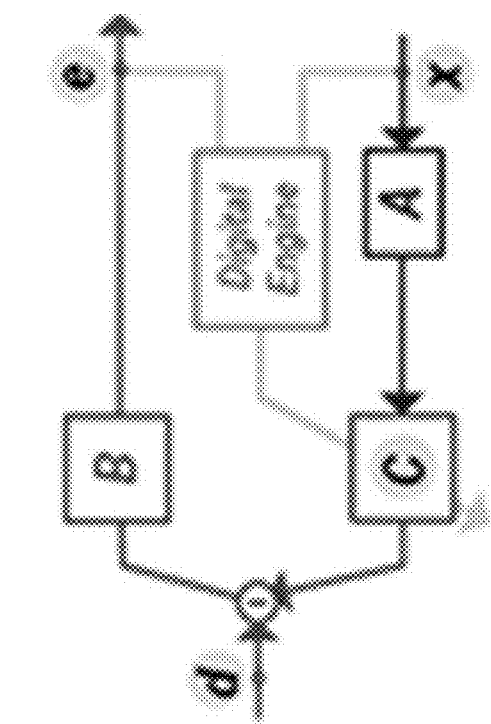
FIG. 16B is a schematic for the baseband equivalent representation of SIC weight adaption loop.
Figure 16A:
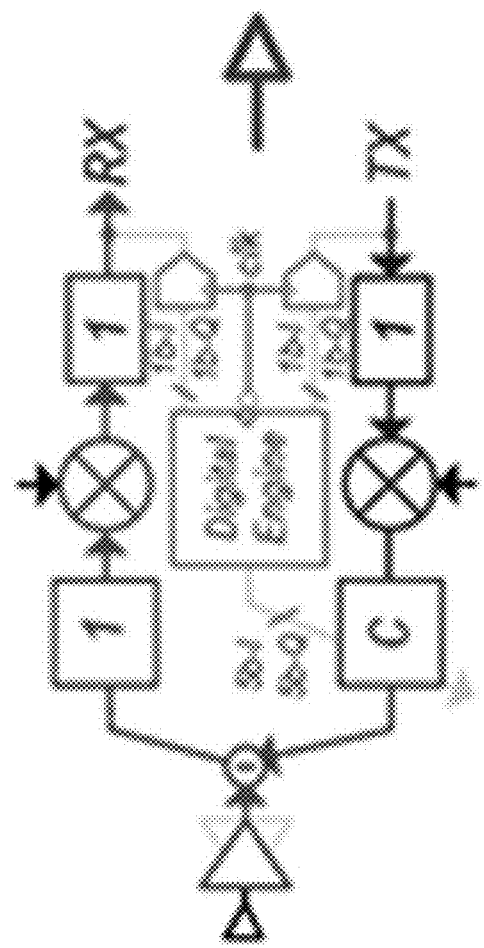
FIG. 16A is a schematic for the digital adaptation circuitry, shown for a single element scenario.

FIG. 16B shows the baseband equivalent representation of the per-element SIC adaptation loop for a single element scenario. Here, complex-weights A and B model the gain and phase shifts of the signal's complex envelop in the TX and RX paths, respectively. Eq. (16) can now be rewritten including A and B for a single element as follows:

$$C(k+1) = C(k) - \mu \nabla_C [|B(d(k) - C(k)x(k)A)|^2]$$

$$= C(k) + 2\mu[e(k)^*][x(k)AB] \quad (17)$$

Although any gain component from the correction factor AB to the TX output x(k) doesn't require calibration, any phase component in this path, if not appropriately accounted, can cause incorrect operation and make the LMS loop not to converge. The correction factor AB can be estimated by transmitting a known symbol (e.g., x) from the transmitter with a unity setting of C's and measuring the output symbol from the RX path (i.e., xAB). Therefore, in the case of sign-sign-LMS, sign(xAB) needs to be estimated once for every possible transmitted symbol (e.g., the calibration requires four cycles for SIC adaptation with QPSK symbols). Because the correction factor AB is approximately the same for each element in the RX array due to symmetry and matching, the correction factor needs to be estimated only once before the beam adaptation cycle in FIG. 15, which makes it low calibration overhead.

Fine-Resolution Polar Weight Update

The disclosed invention prototype uses 5-bit I-path and 5-bit Q-path Cartesian weight (weight implementation is described in Section IV and V). The SIC weight update algorithm in Eq. (17) that is already in the Cartesian form can therefore be directly applied to the Cartesian SIC weights without any additional digital computation. However, to perform finer gain and phase control, the prototype also incorporates additional high-resolution polar gain and phase controls. The fine-grain polar weight (A, θ) set the overall SIC path complex weight only around the proximity of the coarse-grain Cartesian weight ($C_I$, $C_Q$) with high resolution. The polar weight updates (ΔA, Δθ) can be calculated from the known Cartesian weight updates ($\Delta C_I$, $\Delta C_Q$) by solving the Eq. (18):

$$(C_I+\Delta C_I)+j(C_Q+\Delta C_Q)=(A+\Delta A)e^{j(\theta+\Delta\theta)} \quad (18)$$

where:

$$A = \sqrt{C_Q^1 + C_Q^2}; \text{ and}$$

$$\theta = \tan^{-1}\left(\frac{C_Q}{C_I}\right)$$

The solution to the above equation is the following:

$$\Delta A = \frac{(C_I \times \Delta C_I + C_Q \times \Delta C_Q)}{A} \quad (19)$$

$$\Delta\theta = \frac{(C_I \times \Delta C_Q - C_Q \times \Delta C_I)}{A^2}$$

To reduce the computational complexity, only the sign of the polar weight update can be used. Hence, the gain can be updated as $A+\mu_{Ax}\text{sign}(\Delta A)$, and the phase can be updated as $\theta+\mu_{\theta x}\text{sign}(\Delta\theta)$, where $\mu_A$ and $\mu_\theta$ are adaptation rates. Note that the $C_I$ and $C_Q$ values are not updated during multiple cycles of polar weight update, because A and θ are adapted only across the vicinity of $C_I$ and $C_Q$ within one LSB resolution. Additionally, note that the polar weight update is also performed for each element sequentially after the coarse Cartesian weight is settled.

Self-Interference Cancellation Using Group Delay Correction

Figure 17:
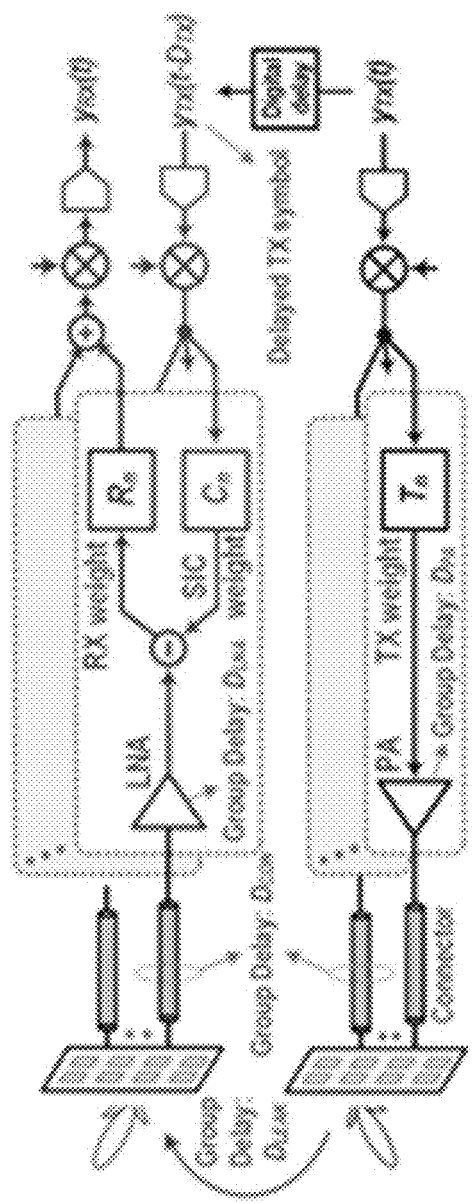
FIG. 17 is a schematic showing Step #1 or Step #3 SIC with digital domain group delay correction.

A potential solution to put an equivalent delay in the digital domain to improve the SIC performance across signal bandwidth, even in the presence of these group delays from various components, will now be disclosed. The first step SIC mechanism is shown in FIG. 17 along with all group delay components. This mechanism may also be used in the third step. After complex weighting in the TX beamformer, the TX path signal travels through various RF elements and acquires group delays as the following: $D_{PA}$ from the PA, $D_{CON}$ from the connector from the PA output to the TX antenna, $D_{LEAK}$ from the TX array to the RX array, $D_{CON}$ from the connector from the RX antenna to the RX input, and finally, $D_{LNA}$ from the LNA. Therefore, with respect to the SIC copy in the RX array, the SI signal has additional group delay of $D_{TOT}=D_{PA}+2D_{CON}+D_{LEAK}+D_{LNA}$.

In the case of an FD system with tiled multi-layer architecture (similar to that shown in FIG. 12), if separate tiles are used for the TX and the RX array, the TX path and the SIC path will have separate upconverter, as shown in FIG. 17. As such, one can put a delay in the digital domain (say, $D_{TX}$) and feed a delayed version of the TX copy to the RX array for SIC. Because $D_{PA}$, $D_{CON}$, and $D_{LNA}$ are fixed for any pair of TX and RX antenna paths, a single fixed $D_{TX}$ (=$D_{PA}$+$2D_{CON}$+$D_{LNA}$) in digital domain can compensate these group delays at once for all RX elements. Assuming digital delay resolution of 0.4 ns (for 250 Msym/s data rate and 10 over-sampling-ratio), worst case residual group delay can be approximated as 0.4 ns. Therefore, even when significant group delays are present, proposed digital domain delay compensation technique can help to achieve over 20 dB SIC for 300 MHz RF BW.

Disclosed herein is a multi-layer MIMO/beamforming architecture that facilitates efficient scaling in the number of antennas and streams without degrading system performance and complexity comprising a multi-layer architecture that employs a fully-connected (FC) "tile" that simultaneously enables inter-band carrier aggregation (dual-band operation) and multi-stream MIMO in each band. The multi-layer architecture employs an FC-tile that enables full-duplex communication with MIMO capability in the receive path, phased-array beamforming (single-stream) in the transmit path, per-antenna self-interference cancellation (SIC) in each RX element of TX signal-leakage and per-stream self-interference cancellation (SIC) in each RX downconversion chain of TX signal-leakage. In addition, a three step SIC technique to perform successive SIC in multi-antenna full-duplex system is disclosed. Lastly, an autonomous SIC weight update algorithm for per-element SIC step has been disclosed.

To those skilled in the art to which the invention relates, many modifications and adaptations of the invention will suggest themselves. Implementations provided herein, including sizes, shapes, ratings and specifications of various components or arrangements of components, and descriptions of specific manufacturing processes, should be considered exemplary only and are not meant to limit the invention in any way. As one of skill in the art would realize, many variations on implementations discussed herein which fall within the scope of the invention are possible.

The invention claimed is:

1. A multi-layer, MIMO beamforming transceiver comprising:
   K tiles comprising $N_A$ antenna elements;
   a first layer interfacing the $N_A$ antenna elements to $N_{RF}$ frequency translation chains; and
   a second layer implementing fully-connected, bi-directional spatial signal processing between the $N_{RF}$ frequency translation chains and $N_S$ streams;
   wherein the K tiles are fully-connected; and
   wherein $N_{RF}$=2K.

2. The transceiver of claim 1 wherein the first layer applies RF-domain complex weighting to the $N_{RF}$ frequency translation chains.

3. The transceiver of claim 1 wherein the spatial signal processing in the second layer occurs in the analog domain.

4. The transceiver of claim 1 wherein the fully-connected beamforming in the second layer occurs in the digital domain.

5. The transceiver of claim 1 wherein complex weights are applied to received frequency translation chains to spatially separate the NS streams.

6. The transceiver of claim 1 comprising a receive path using a Cartesian combining architecture to perform RF domain beamforming in each stream of each fully-connected tile in the first layer.

7. The transceiver of claim 1 comprising a transmit path using a Cartesian-splitting architecture to perform RF domain beamforming in each stream of each fully-connected tile in the first layer.

8. The transceiver of claim 1 further comprising:
a low-noise amplifier/power amplifier dual-band bi-directional interface connected to each antenna element.

9. The transceiver of claim 8 further comprising:
a dual-band bi-directional beamforming network with shared passives between transmit and receive paths, coupled to the low-noise amplifier/power amplifier interfaces.

10. The transceiver of claim 9 further comprising:
$N_S$ homodyne complex-quadrature up/down conversions stages, coupled to the beamforming network, one stage per stream respectively.

11. The transceiver of claim 10 further comprising:
a dual-band local oscillation generation and distribution network.

12. The transceiver of claim 11 further comprising:
a three-step self-interference cancellation (SIC) mechanism.

13. The transceiver of claim 12 wherein a first step of the three-step SIC mechanism comprises:
using one stream in each receive beamformer to inject a complex-weighted transmit signal at an output node of each low-noise amplifier.

14. The transceiver of claim 13 wherein the complex weights are dynamically computed using a minimum-mean-square-error criterion to minimize the residual self-interference using a least-mean-squared algorithm.

15. The transceiver of claim 14 wherein the least-mean-squared algorithm uses time-multiplexed error extraction.

16. The transceiver of claim 13 wherein a second step of the three-step SIC mechanism comprises:
using beamforming degrees of freedom in the receive portion of the beamforming network to minimize residual self-interference after beamforming.

17. The transceiver of claim 16 wherein a third step of the three-step SIC mechanism comprises:
injecting a self-interference cancellation signal after the RF-domain receive beamforming at an input of a downconversion stage.

18. The transceiver of claim 17 wherein further self-interference cancellation is performed at baseband stage in either the analog or digital domains.

19. The transceiver of claim 17 wherein the first and third step cancellations use a transmit signal copy with digital domain delay to achieve wideband self-interference cancellation.

20. A multi-layer, MIMO beamforming transceiver comprising:
K tiles comprising $N_A$ antenna elements;
a first partially-connected layer interfacing the $N_A$ antenna elements to $N_{RF}$ frequency translation chains; and
a second fully-connected analog layer implementing bi-directional spatial signal processing between the $N_{RF}$ frequency translation chains and $N_S$ streams;
wherein $N_{RF}=K$.

21. A multi-layer, MIMO beamforming transceiver comprising:
K tiles comprising $N_A$ antenna elements;
a first fully-connected layer interfacing the $N_A$ antenna elements to $N_{RF}$ frequency translation chains; and
a second fully-connected digital layer implementing bi-directional spatial signal processing between the $N_{RF}$ frequency translation chains and the $N_S$ streams;
wherein $N_{RF}=2K$.

22. A multi-layer, MIMO beamforming transceiver comprising:
K tiles comprising $N_A$ antenna elements;
a first fully-connected layer interfacing the $N_A$ antenna elements to $N_{RF}$ frequency translation chains; and
a second fully-connected analog layer implementing bi-directional spatial signal processing between the $N_{RF}$ frequency translation chains and the $N_S$ streams;
wherein $N_{RF}=2K$.

23. The transceiver of claim 22 further comprising:
a third, fully-connected digital layer coupled to the second layer via a plurality of analog-to-digital converters.

* * * * *